(12) United States Patent
Deng et al.

(10) Patent No.: US 10,568,052 B2
(45) Date of Patent: *Feb. 18, 2020

(54) DEVICE-TO-DEVICE (D2D) CROSS LINK POWER CONTROL

(71) Applicant: InterDigital Patent Holdings, Inc., Wilmington, DE (US)

(72) Inventors: Tao Deng, Roslyn, NY (US); Gregory S Sternberg, Mt. Laurel, NJ (US); Paul Marinier, Brossard (CA); Gwenael Poitau, Montreal (CA); Marian Rudolf, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/713,046

(22) Filed: Sep. 22, 2017

(65) Prior Publication Data

US 2018/0014265 A1   Jan. 11, 2018

Related U.S. Application Data

(63) Continuation of application No. 13/906,063, filed on May 30, 2013, now Pat. No. 9,807,709.
(Continued)

(51) Int. Cl.
*H04W 52/38* (2009.01)
*H04W 52/24* (2009.01)
(Continued)

(52) U.S. Cl.
CPC ....... *H04W 52/383* (2013.01); *H04W 52/242* (2013.01); *H04W 52/346* (2013.01);
(Continued)

(58) Field of Classification Search
CPC . H04W 52/146; H04W 52/34; H04W 52/367; H04W 92/18; H04W 24/00;
(Continued)

(56) References Cited

U.S. PATENT DOCUMENTS

2006/0234643 A1   10/2006   Kikuchi
2008/0220806 A1   9/2008   Shin
(Continued)

FOREIGN PATENT DOCUMENTS

| CN | 1619993 | 5/2005 |
| CN | 1757257 | 4/2006 |
| CN | 1810051 | 7/2006 |
| CN | 101478815 | 7/2009 |
| CN | 102246575 | 11/2011 |
| EP | 2866366 | 4/2015 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, Dec. 2010, 53 pages.
(Continued)

*Primary Examiner* — Golam Sorowar
(74) *Attorney, Agent, or Firm* — Eric Berkowitz

(57) ABSTRACT

Device-to-device (D2D) cross link power control systems and methods may be disclosed. For example, a device such as a UE or WTRU may determine whether it may have simultaneous transmissions where at least one of the transmissions may include a cross link transmission. The device may further determine whether a total transmit power of the simultaneous transmissions may exceed a maximum transmit power of the device. If the device may have simultaneous transmissions and such transmissions may exceed the maximum transmit power, the device may reallocate power based on a priority or priority setting. The device may further determine a maximum cross link power, a maximum device power, and a cross link transmit power level such that
(Continued)

the device may further control the power for transmissions based thereon.

20 Claims, 6 Drawing Sheets

Related U.S. Application Data

(60) Provisional application No. 61/785,033, filed on Mar. 14, 2013, provisional application No. 61/653,765, filed on May 31, 2012.

(51) Int. Cl.

| | | |
|---|---|---|
| *H04W 92/18* | (2009.01) | |
| *H04W 52/28* | (2009.01) | |
| *H04W 52/34* | (2009.01) | |
| *H04W 52/36* | (2009.01) | |
| *H04W 88/06* | (2009.01) | |
| *H04W 76/14* | (2018.01) | |
| *H04W 76/15* | (2018.01) | |

(52) U.S. Cl.
CPC ........ *H04W 52/365* (2013.01); *H04W 52/367* (2013.01); *H04W 88/06* (2013.01)

(58) Field of Classification Search
CPC ..... H04W 24/10; H04W 28/06; H04W 48/08; H04W 52/08; H04W 52/24; H04W 52/241; H04W 52/242; H04W 52/267; H04W 52/281; H04W 52/325; H04W 52/346; H04W 52/365; H04W 52/383; H04W 56/0045; H04W 72/12
See application file for complete search history.

(56) References Cited

U.S. PATENT DOCUMENTS

| | | | |
|---|---|---|---|
| 2009/0325625 A1* | 12/2009 | Hugl | H04W 52/16 455/522 |
| 2010/0093364 A1 | 4/2010 | Ribeiro et al. | |
| 2010/0151804 A1 | 6/2010 | Song et al. | |
| 2010/0261469 A1 | 10/2010 | Ribeiro et al. | |
| 2011/0222455 A1* | 9/2011 | Hou | H04W 52/267 370/311 |
| 2011/0237289 A1 | 9/2011 | Fodor et al. | |
| 2011/0243010 A1 | 10/2011 | Geirhofer et al. | |
| 2011/0275382 A1 | 11/2011 | Hakola et al. | |
| 2011/0306349 A1* | 12/2011 | Hakola | H04W 28/04 455/450 |
| 2011/0319120 A1* | 12/2011 | Chen | H04W 52/367 455/522 |
| 2012/0064936 A1 | 3/2012 | Vrzic et al. | |
| 2012/0093098 A1 | 4/2012 | Charbit et al. | |
| 2012/0258706 A1* | 10/2012 | Yu | H04W 56/002 455/426.1 |
| 2012/0269072 A1* | 10/2012 | Wu | H04W 52/242 370/242 |
| 2013/0058315 A1 | 3/2013 | Feuersaenger et al. | |

FOREIGN PATENT DOCUMENTS

| | | |
|---|---|---|
| TW | 201220891 | 5/2012 |
| WO | WO-2004/077920 | 9/2004 |
| WO | WO-2008/034029 | 3/2008 |
| WO | WO-2008/114663 | 9/2008 |
| WO | WO-2010/035100 | 4/2010 |
| WO | WO-2012/049351 | 4/2012 |
| WO | WO-2013/181444 | 12/2013 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.4.0, Dec. 2011, 54 pages.
"3rd Generation Partnership Project; Technical Specification Group Radio Access Network; Evolved Universal Terrestrial Radio Access (E-UTRA); Physical channels and modulation (Release 10)", 3GPP TS 36.211 V10.0.0, Dec. 2010, 103 pages.
"3rd Generation Partnership Project; Technical Specification Group Radio Access Network; Evolved Universal Terrestrial Radio Access (E-UTRA); Radio Resource Control (RRC) protocol specification (Release 10)", 3GPP TS 36.331 V10.0.0, Dec. 2010, 276 pages.
"3rd Generation Partnership Project; Technical Specification Group Radio Access Network; Evolved Universal Terrestrial Radio Access (E-UTRA); User Equipment (UE) radio transmission and reception (Release 10)", 3GPP TS 36.101 V10.0.0, Oct. 2010, 188 pages.
"3rd Generation Partnership Project; Technical Specification Group Radio Access Network; Multiplexing and channel coding (Release 10)", 3GPP TS 36.212 V10.0.0, Dec. 2010, 72 pages.
"3rd Generation Partnership Project; Technical Specification Group Radio Access Network; Physical layer procedures (Release 10)", 3GPP TS 36.213 V10.0.0, Dec. 2010, 98 pages.
"Chinese Office Action", Chinese Application No. 201380029035.1, dated Aug. 22, 2017, 9 pages.
"Chinese Office Action (English Translation)", Chinese Application No. 201380029035.1, dated Aug. 22, 2017, 12 pages.
"English Language Abstract", Chinese Publication No. 1619993, May 25, 2005, 1 page.
"Japanese Official Notice of Rejection", Japanese Application No. 2015-515202, dated Jun. 6, 2017, 4 pages.
"Japanese Official Notice of Rejection (English Translation)", Japanese Application No. 2015-515202, dated Jun. 6, 2017, 5 pages.
"Patent Abstract", Patent Publication No. WO 2008/114663, Sep. 25, 2008, 2 pages.
"United States Final Office Action", U.S. Appl. No. 13/906,063, dated Dec. 21, 2016, 13 pages.
Deng, Eric, et al., "LTE Layer-2 Data Plane Architecture for Coverage Extension Mode in Advanced Topologies Applications", Technical Idea White Paper, dev-adv-air-interface\Technical Ideas\NGC\NCG[0061] L2 Data Plane Architecture for Coverage Extension Mode in Advanced Topologies Applications, Jun. 10, 2011, 33 pages.
Deng, Tao, et al., "Cross Link Grant Procedure in AT Applications", Technical Idea White Paper, \\dev-adv-air-interface\Technical Ideas\NGC\NGC[0067] Cross Link Grant\Cross Link Grant Procedure in AT Applications.docx, Feb. 1, 2012, 29 pages.
Deng, Tao, et al., "D2D Cross Link Power Control", Technical White Idea Paper, \\dev-adv-air-interface\Technical Ideas\NGC\NGC[0074] D2D Cross Link Power Control\D2D Cross Link Power Control.docx, Apr. 23, 2012, 19 pages.
Deng, Tao, et al., "Neighbor Discovery Methods in Advanced Topology Applications", Technical Idea White Paper, dev-adv-air-interface\Technical Ideas\NGC[0050] Neighbor Discovery in Advanced Topology Applications\Neighbor Discovery Methods in Advanced Topology Applications.docx, Feb. 18, 2011, 33 pages.
Fujitsu, "Discussion on simultaneous transmissions of PRACH and PUCCH/PUSCH/SRS", 3GPP Tdoc R1-120754; 3GPP TSG RAN WG1 Meeting #68, Dresden, Germany, Feb. 6-10, 2012, 4 pages.
Pragada, et al., "AT Coverage—Idle Mode Procedures", Technical Idea White Paper, \dev-adv-air-interface\Technical Ideas\NGC\NGC[0057] AT Coverage_13 Idle Mode Procedures, Jul. 5, 2011, 30 pages.
Sternberg, Greg, et al., "Phase 1 System Architecture for Capacity Enhancement", dev-adv-air-interface\Projects\Next Gen Cellular\Advanced Topologies\Phase 1 \Ph1_System_Architecture_Documents.docx, Feb. 22, 2016, 67 pages.
Sternberg, Greg, et al., "System Capacity Whitepaper", dev-adv-air-interface\Projects\Next Gen Cellular\Advanced Topologies\Phase0\System_Capacity_WP.doc, Feb. 22, 2016, 37 pages.
U.S. Pat. No. 9,807,709, issued Oct. 31, 2017.

* cited by examiner

DEVICE-TO-DEVICE (D2D) CROSS LINK POWER CONTROL

CROSS REFERENCE TO RELATED APPLICATIONS

This application is a continuation of U.S. patent application Ser. No. 13/906,063 filed on May 30, 2013, which claims the benefit of U.S. Provisional Patent Application Nos. 61/653,765 filed on May 31, 2012, and 61/785,033 filed on Mar. 14, 2013, each of which is incorporated herein by reference.

BACKGROUND

Currently, when a device such as a UE engages in device-to-device (D2D) communication in connection with applications such as advanced topology (AT) applications, the device may operate two transmissions or transmission links in parallel. For example, the device may operate an uplink transmission to a network component such as an eNB and another transmission such as a cross link (XL) transmission to another device such as another UE. Unfortunately, management of the additional radio transmission or link (e.g. the XL transmission or link in combination with the uplink) by the device may currently cause problems associated with scheduling between the links or transmissions, resource allocation of the links or transmissions, power control of the links or transmissions, and the like.

SUMMARY

Cross link power control systems and methods (e.g. for device to device (D2D) architectures) may be disclosed. For example, a device such as a UE or WTRU may determine whether it may have simultaneous transmissions where at least one of the transmissions may include a cross link transmission. The device may further determine whether a total transmit power of the simultaneous transmissions may exceed a maximum transmit power of the device. If the device may have simultaneous transmissions and such transmissions may exceed the maximum transmit power, the device may reallocate power based on a priority or priority setting. Additionally, in embodiments, the device may further determine a maximum cross link power and a maximum device power such that the device may further control the power for transmissions based thereon (e.g. the device may adjust the power of transmissions to not exceed the maximum device power and the power of the cross link transmission to not exceed the maximum cross link power). The device may further determine a cross link transmit power level such as a power level to transmit the cross link transmission at (e.g. that may be below the maximum cross link power) and may further control the transmission power, for example, for transmissions to another device based on the cross link power level.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to the limitations that solve one or more disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application Systems and/or methods for managing such as controlling power of transmission links (e.g. an uplink and/or a cross link (XL)) in parallel or simultaneously may be provided. For example, in an embodiment, power control may regulate both a maximum total cross link transmit power and a per-TTI dynamic transmit power of cross link physical control and data channels, may administer the prioritized power reallocation between simultaneous uplink and/or cross link physical channels and signals given a total device transmit power constraint, may manage the cross link power headroom reporting coherently with the current uplink power headroom reporting based on the cross link measurements including path loss, signal and interference strength, reference signal SINR and data channel BLER, and the like as described herein.

Figure 1A:
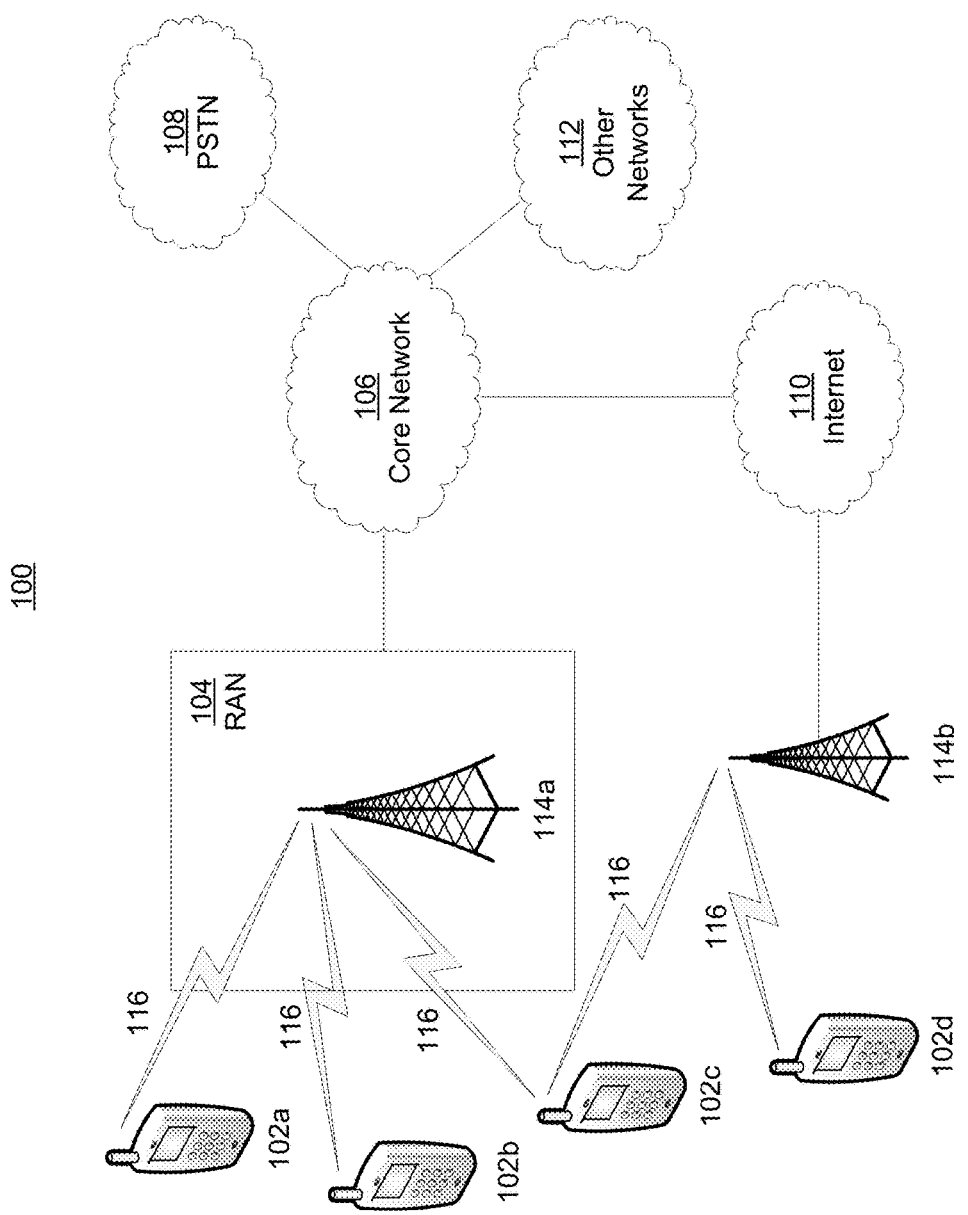
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN)

108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
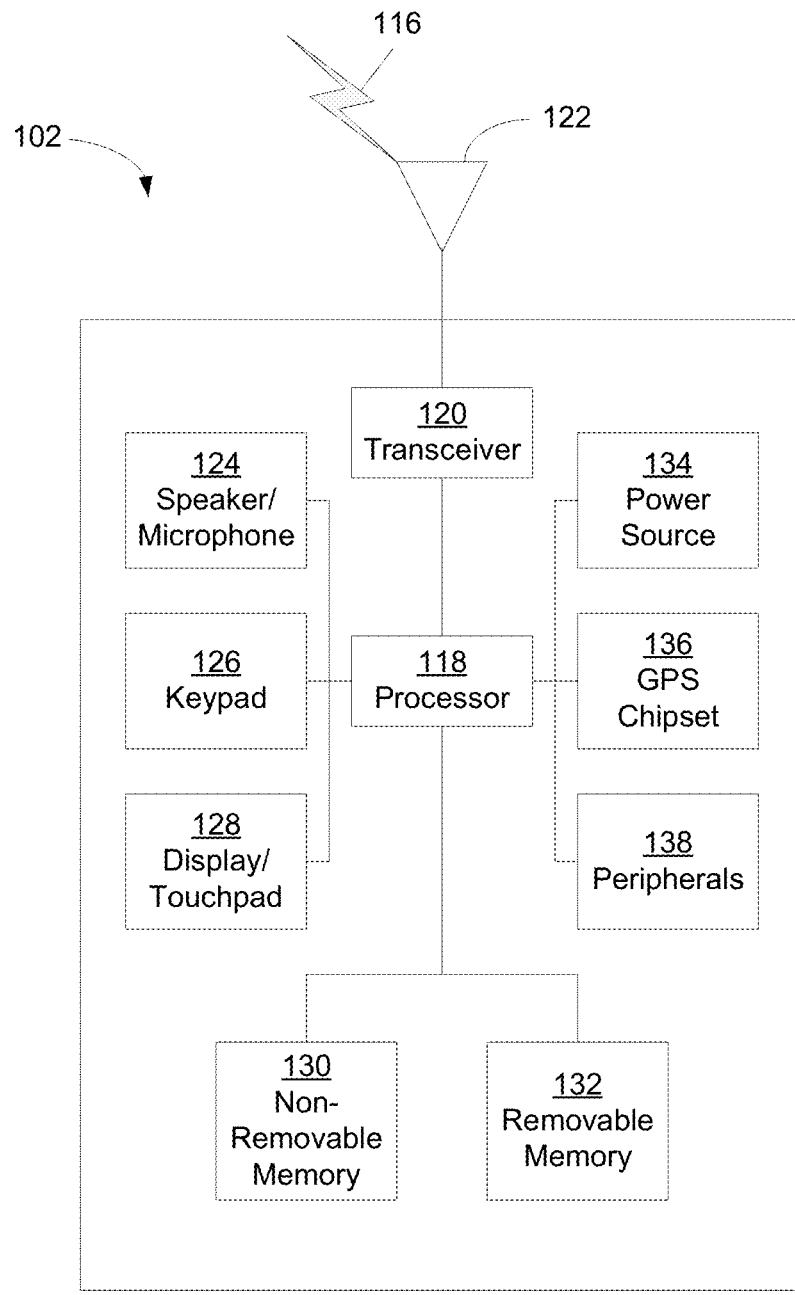
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. It is noted that the components, functions, and features described with respect to the WTRU 102 may also be similarly implemented in a base station.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
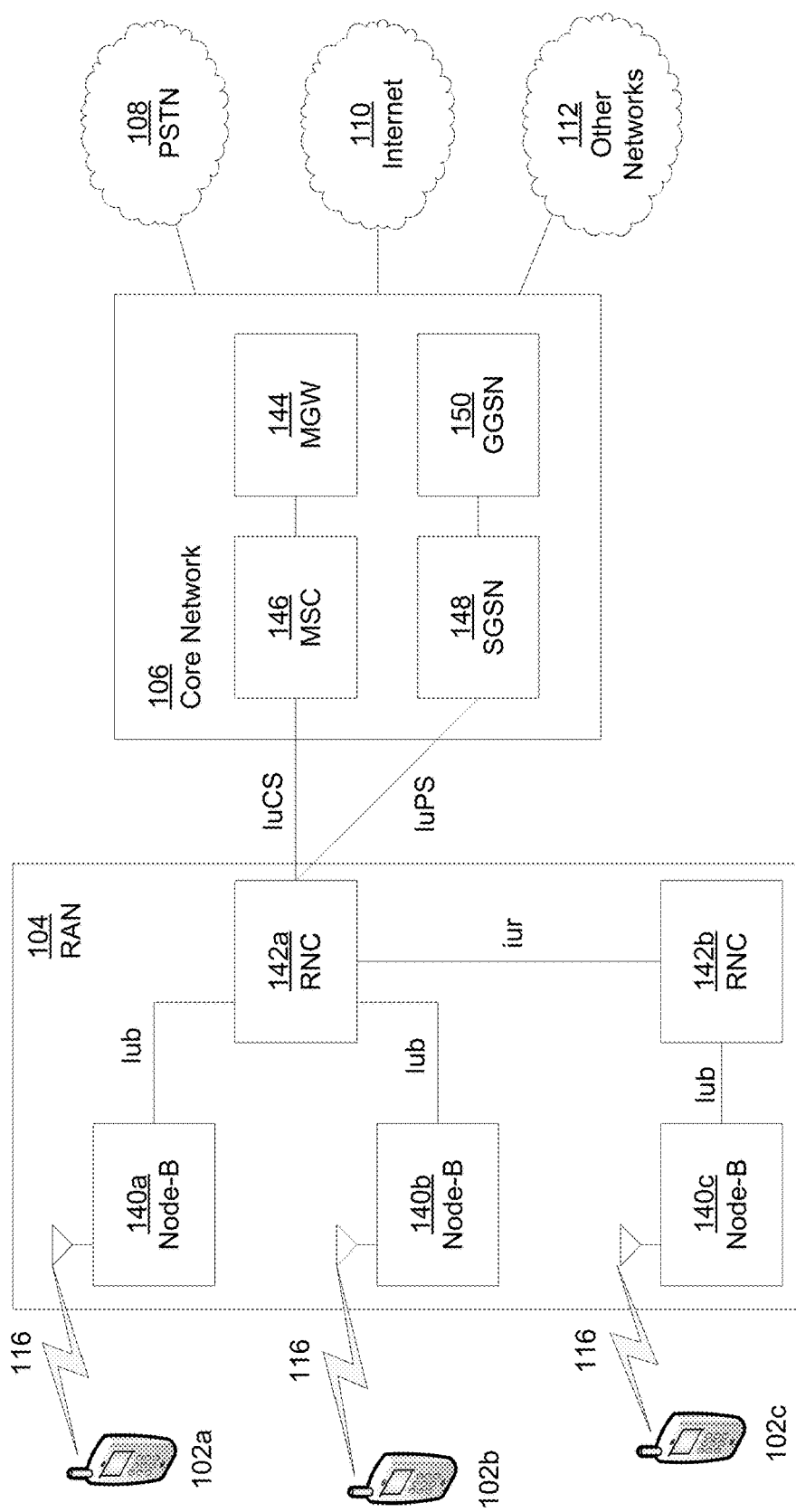
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
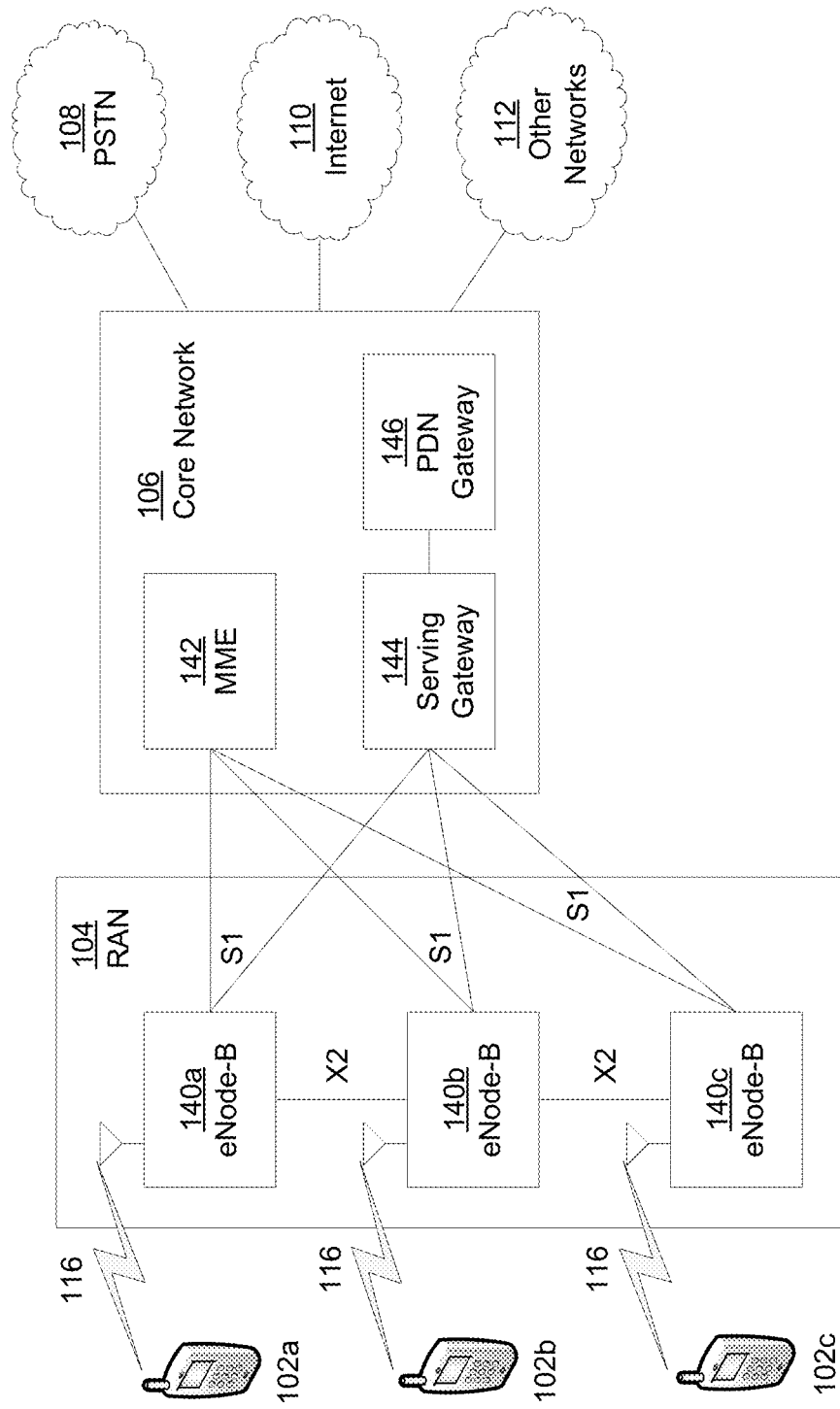
FIG. 1D is a system diagram of another example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 3interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
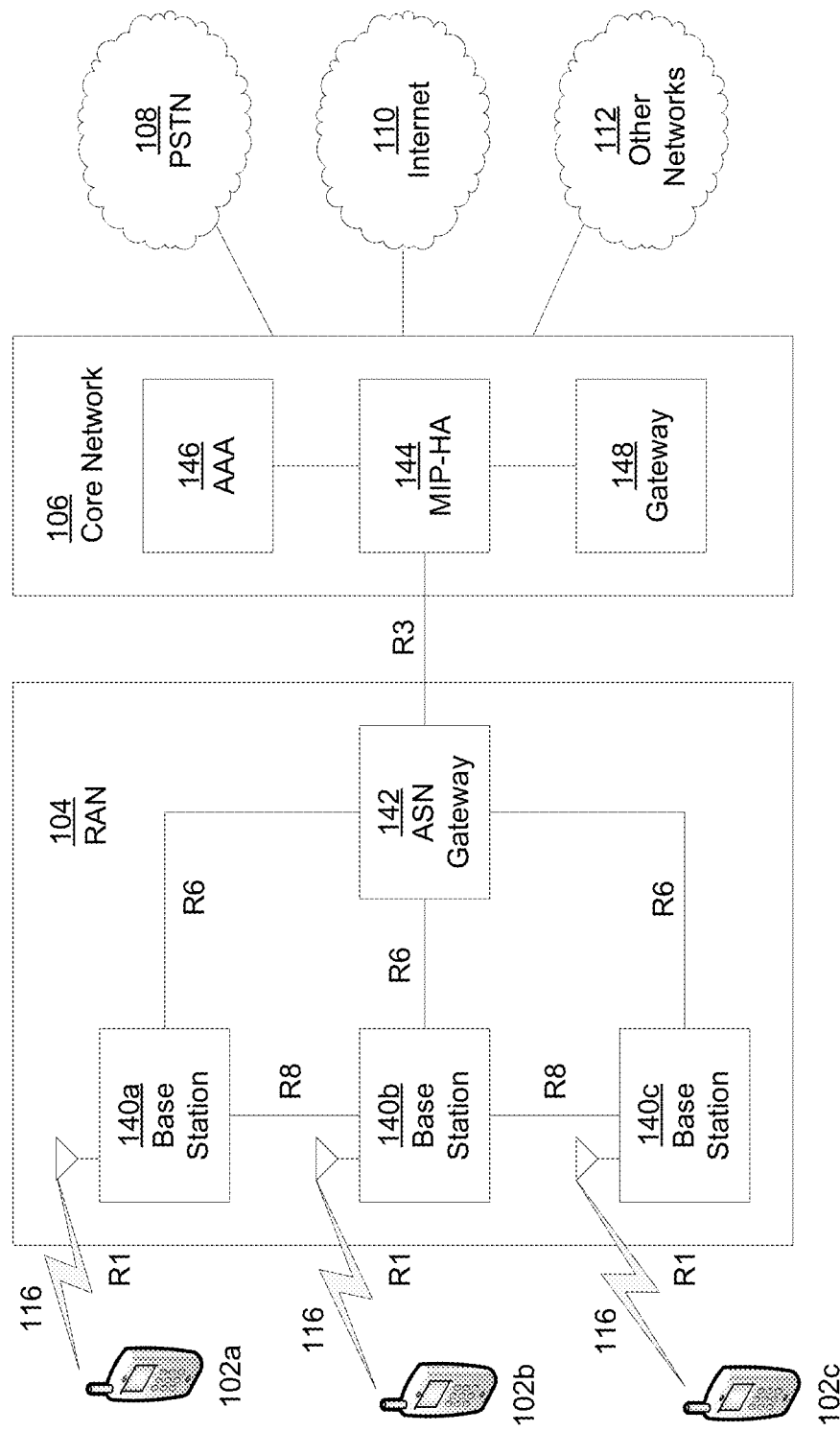
FIG. 1E is a system diagram of another example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like.

The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

As described herein, when a device such as a UE engages in device-to-device (D2D) communication, the device may operate two transmissions or transmission links in parallel. For example, the device may operate an uplink transmission to a network component such as an eNB and another transmission such as a cross link (XL) transmission to another device such as another UE. Unfortunately, management of the additional radio transmission or link (e.g. the XL transmission or link in combination with the uplink) by the device may currently cause problems associated with scheduling between the links or transmissions, resource allocation of the links or transmissions, power control of the links or transmissions, and the like.

To facilitate scheduling, resource allocation, power control, and/or other management operations between the links or transmission that may be operated in parallel or simultaneously (e.g. an XL transmission and an uplink), power control systems and/or methods may be provided and/or used to regulate both the maximum total cross link transmit power and the per-TTI dynamic transmit power of the cross link physical control and data channels, to administer the prioritized power reallocation between the simultaneous uplink and/or cross link physical channels and signals given the total UE transmit power constraint, and to manage the cross link power headroom reporting coherently with the current uplink power headroom reporting based on the cross link measurements including path loss, signal and interference strength, reference signal SINR and data channel BLER.

For example, in an example embodiment, a maximum total cross link transmit power may be semi-statically configured by the network to optimize the cross link spectrum and power efficiency and may manage the inter-cross-link interferences based on cross link power headroom reporting and signal and interference measurements. Additionally, a dynamic cross link transmit power may be controlled on a per-TTI basis to achieve a semi-statically configured desired operating point with the help of the dynamic offsets calculated from transmission parameters such as bandwidth, transport format, and Transmit Power Control (TPC) commands. The dynamic cross link power control may be centralized, for example, performed by the network in a similar manner as the uplink power control in which a UE may calculate the sub-frame transmit power using the transmission parameters provided by the network via either PDCCH or RRC signaling. Alternatively, it may be distributed (e.g. performed by the UEs in the sense that the UEs may derive the transmission parameters such as the TPC commands without the network involvement). In an embodiment, one or more types (e.g. new types) of power headroom (PH) dedicated for the cross link may be triggered by events (e.g. new events) specific to the cross link and reported to the network in a new MAC Control Element or appended in the extended power headroom MAC control Element.

According to example embodiments, the systems and methods described herein (e.g. the power control systems and/methods or mechanism) may also be applicable to both the network and UEs operating in a cellular LTE based system with the introduction of direct links between UEs.

For example, as described herein, user equipment (UE) transmit power of physical uplink control channel (PUCCH), physical uplink shared channel (PUSCH), and sounding reference signals (SRS) may be controlled by the network to ensure that they may be received at the evolved nodeB (eNB) at sufficient signal to interference plus noise ratio (SINR) required by the assigned transport formats. The uplink power control may also enable the interference management and rate adaptation and may be performed per channel for each serving cell while the serving cells may be carried on different component carriers (e.g. in a carrier aggregation (CA) configuration). For example, the PUCCH and PUSCH of a primary cell (Pcell) may be power-controlled independently as well as the PUSCH of the Pcell and PUSCH of a secondary cell (Scell). The Pcell and Scells associated with a UE (e.g. when the UE may be in an RRC CONNECTED mode) may be defined as a set of serving cells for this UE. Additionally, in an embodiment, when CA may not be configured, a UE may have one serving cell that may be the primary cell.

In such an embodiment, although each component carrier transmit power may be capped at the configured maximum per-serving-cell level of $P_{CMAX,c}$ (e.g. as described above), the sum of channel power may exceed the maximum UE transmit power of $P_{CMAX}$. The $P_{CMAX,c}$ and $P_{CMAX}$ derivations may have been specified for non-CA and non-MIMO configurations, for CA configurations, and for MIMO configurations. As such, the transmit power reallocation and scaling may be performed based on or according to a pre-defined priority setting of each channel. For example, when PUCCH and multiple PUSCH carrying user data may be transmitted simultaneously, the PUCCH may be first assigned with its power-controlled level and the remainder of the power may be evenly distributed to PUSCHs, which may lead to the need for a power scaling of each PUSCH if the rationed power level may be below the power-controlled level.

Additionally, the per-channel uplink power control may be a dynamic power control system or method (e.g. mechanism) that may be applied on a sub-frame basis and may include of an open-loop component and a closed-loop component. The open-loop component may determine a coarse semi-static operating point to achieve the SINR required by the configured transport format. As such, in an embodiment, the path loss and wide-band shadowing may be taken into consideration in the open-loop component. Additionally, a UE may receive a nominal or desired power level via higher layer signaling and may estimate the path loss based on the reference signal received power (RSRP) measurement and the transmit power of the cell specific reference (CRS) of the reference cell. Both the reference cell and the CRS transmit level may be received via higher layer signaling as well.

One or more dynamic offsets applied in the closed-loop component may be used to counter-act the small-scale multi-path condition and interference variation. In an embodiment, a UE may calculate the dynamic offsets based on the granted transmission bandwidth and/or MCS or the received explicit TPC commands. The transmission bandwidth and/or MCS may be specified in a DCI format 0 and 4 in PDCCH, for example, using C-RNTI. The TPC commands for the PUSCH may be received together with the associated uplink grant in the DCI format 0 or 4 using TPC-PUSCH-RNTI. Additionally, the TPC commands for the PUCCH may be received together with downlink scheduling in a DCI format 1/1A/2/2A using, for example, TPC-PUCCH-RNTI. In additional embodiments, the TPC commands may be carried without an uplink grant in DCI format 3/3A, for example, in a joint manner (i.e. TPC commands for multiple UEs may be carried). TPC commands that may be carried in DCI format 3/3A may be applied in the accumulative mode in which the TPC commands may denote the changes relative to the previous changes. The TPC commands may further be applied in an absolute mode in which the TPC commands may denote the power offset relative to the open-loop operating point regardless of the previous received TPC commands.

According to an embodiment, for example, which may be enabled by the direct UE-to-UE communications, Advanced Topology (AT) applications may be provided and/or used as described herein. The AT applications described herein may include an advanced topology-relay (AT-R) and an advanced topology-local offload (AT-LO). In the AT-R application, a terminal UE (T-UE) may be able to exchange data with the network through a relay node which may be a Helper UE (H-UE). Additionally, the AT-LO application may enable the direct data communication between UEs in proximity under the control of the central network.

In an embodiment, the AT-R application may include one or more modes such as a capacity mode and coverage mode. In, for example the capacity mode, the T-UE may be associated with the network and may enlist the H-UE to augment the radio link capacity and improve data transmission capacity. In, for example, the coverage mode the T-UE may be out of network coverage and may rely on an H-UE to obtain a network association.

Additionally, according to an embodiment, a radio link (e.g. new radio link) may be provided between a pair of T-UE and H-UE in the AT-R applications and a pair of UEs in the AT-LO application. Such a radio link may be denoted as cross link (XL). The physical channels that may be used on the XL may be OFDM-based and may be described herein.

In an embodiment, a Cross Link Physical Neighbor Discovery Channel (XPNDCH) may be provided and/or used. This channel may carry physical layer sequences used for neighbor discovery beacon transmissions including Neighbor Discovery Initiation Transmission (NDIT) and Neighbor Discovery Response Transmission (NDRT). Additionally, such a channel may occupy a default and pre-defined symbol and sub-carrier resource location that may not be subject to cross link grants or scheduling and/or may apply code division multiple access and the code configuration may be derived by a UE according to pre-defined techniques and/or algorithms. According to an embodiment, when the cross link bandwidth may be more than the default frequency resource pre-arranged for the neighbor discovery process, the network may allocate additional sub-carriers (resources) for the channel to increase the neighbor discovery capacity.

A Cross Link Physical Control Channel (XPCCH) may also be provided and/or used. This channel may carry the Cross Link Control Information (XCI) formats. Different XCI formats may be used for scheduling-related control information, the Channel State Information (CSI), HARQ ACK/NACK, TPC Commands, Scheduling Requests (SR), and the like. In an embodiment, errors in the XCI may be e detected by appending CRC bits. The complete resource allocation of this channel may be determined by a centrally-controlled semi-static grant. XPCCH may apply space, time, frequency, or code division multiple access. In an embodiment, there may be different types of XPCCHs defined as the design progresses and the discussion pertaining to the power control can be applicable to each of the channels. Additionally, in a centralized scheduling scheme, the scheduling XCI may be carried in PDCCH and the feedback or HARQ related XCI may be carried in PUCCH/PUSCH and the XPCCH may not be applied.

According to another embodiment, Cross Link Physical Data Channel (XPDCH) may be provided and/or used. This channel may carry the cross link user data received from the MAC layer. The complete resource allocation of this channel may be determined by the H-UE cross link grant (XLG). XPDCH may apply space, time, frequency, code division multiple access, and the like.

The cross link may carry cross link specific reference signals as well. Such signals may be used for cross link signal measurement, timing and frequency synchronization, control channel estimation, and the like. Different physical channels may be multiplexed into different types of cross link sub-frames.

According to an embodiment, a multiplexing scheme may be used as described herein. In an embodiment, the multiplexing scheme may include, for example, time-multiplexing the XPCCH and XPDCH (e.g. the XPCCH and XPDCH may not be transmitted simultaneously). For example, the multiplexing may resemble that of PDCCH and PDSCH in a downlink such as a long term evolution (LTE) downlink. Additionally, the XPCCH may occupy a number of symbol locations in the beginning of one sub-frame followed by the symbols allocated for the XPDCH. Based on the different power levels XPCCH and XPDCH may use or apply, time-multiplexing may reduce the cross link signal peak-to-average power ratio and may improve the power amplifier efficiency. Time-multiplexing may also facilitate a sequential decoding where scheduling information in the XPCCH may be decoded first and the decoding of XPDCH may proceed when XPCCH decoding may be successful. As such, in an embodiment, the receiving functionality may be switched off during the XPDCH duration (e.g. when the XPCCH indicates there may not be XPDCH data) to save battery power. The XPCCH and XPDCH power difference may further cause sub-carrier power imbalance within one sub-frame and scaling may be needed to even it out.

The multiplexing scheme that may be used may also include frequency-multiplexing of the XPCCH and XPDCH. Such a scheme may be used due to the relatively low cross link transmit power. For example, the multiplexing may be similar to that of an uplink such as an LTE uplink. In such an embodiment, both the XPCCH and XPDCH may span over a TTI (e.g. an entire TTI) on different sub-carriers and, thus, may be transmitted simultaneously. In this case, power reallocation may be provided and/or used based on whether (e.g. if) a total power may exceed a maximum cross link power. Additionally, in such an embodiment, the UE may not be able to decode the XPCCH completely and/or receive or aquire scheduling information until the end of the TTI. As such, the UE may buffer the DPDCH to decode after the XPCCH decoding may be done.

According to an additional embodiment, the multiplexing scheme may include code-multiplexing the XPCCH and XPDCH (e.g. in a similar manner as the uplink DPCCH/DPCCH in WCDMA systems). In such an embodiment, the channels may span over one TTI and may use the same frequency resources, but they may apply different orthogonal spreading codes. Additionally, in such an embodiment, buffering of the DPDCH data may be increased compared to the time-multiplexing scheme.

Additionally, as described herein, a MAC layer and/or a PHY layer may be provided and/or used. The MAC layer may provide services to the Radio Link Control (RLC) in the form of logical channels. The type of logical channel may be either a control channel used for transmission of control and configuration information or a traffic channel used for carrying the user data. The cross link logical channels may include PCCH, XCCCH, DCCH and DTCH.

Figure 2:
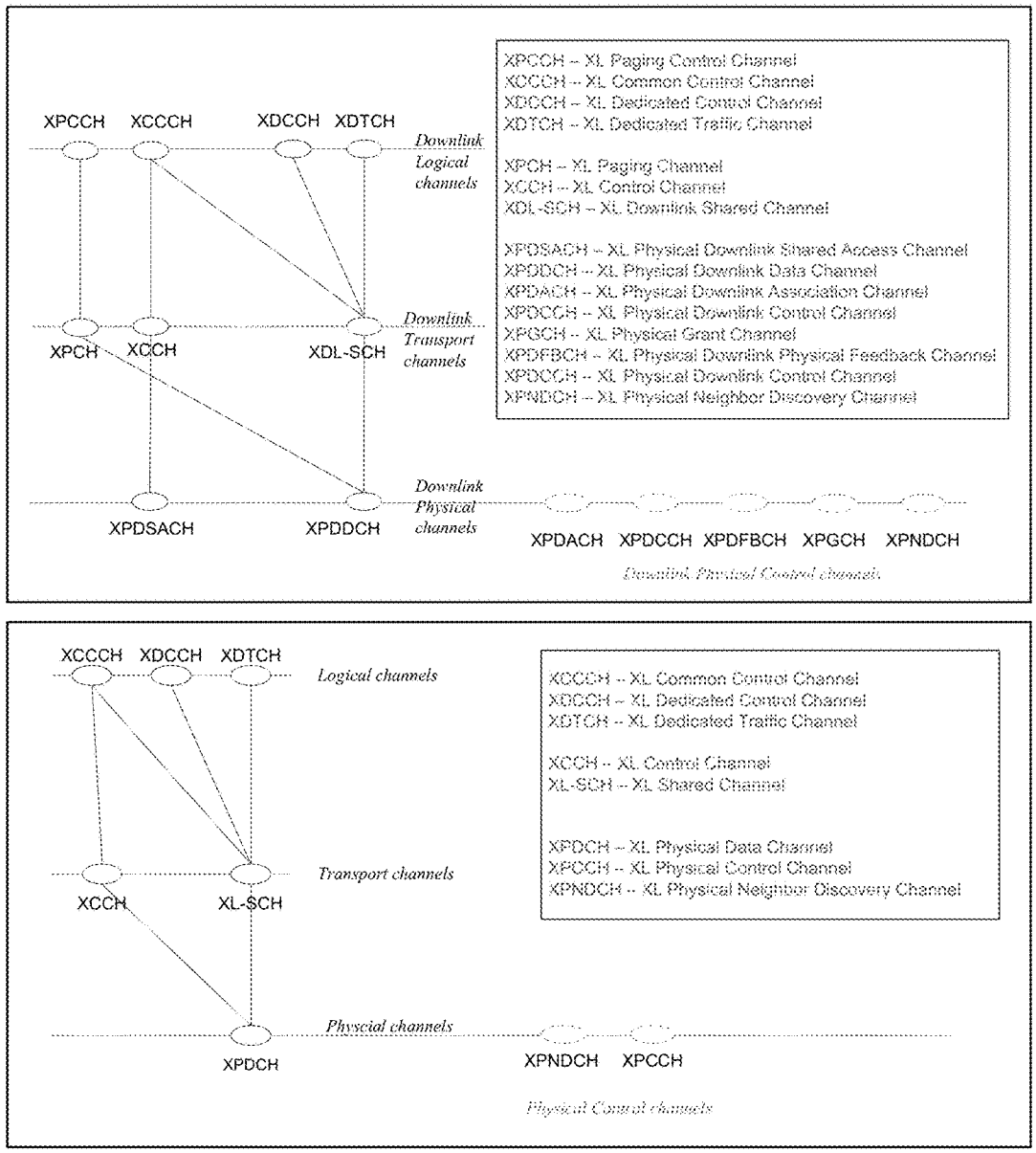
FIG. 2 illustrates diagrams of example embodiments of cross link channel mapping.

The PHY layer that may offer services to the MAC in the form of transport channels and the cross link transport channels may include XPCH, XCCH and XL-SCH. Data on a transport channel may be organized into transport blocks and normally in each TTI one transport block of a certain size may be transmitted. In the case of spatial multiplexing (e.g. MIMO), up to two transport blocks may be transmitted in one TTI. A preliminary example of channel mapping between logical, transport and physical channels on the cross link may be depicted in FIG. 2, which illustrates diagrams of example cross link channel mapping.

As described herein, when a UE may engage in UE-to-UE communication in connection with AT applications, it may operate two transmissions in parallel. One may be the uplink transmission to the eNB and the other may be the cross link transmission to the other UE. The UE transmit power may be considered as a type of shared resource between channels operating on the two radio links, which may use a power control system and/or method described herein that may execute and coordinate the power control of each radio link transmission. The cross link transmission power control may be integrated into the existing uplink power control to handle (e.g., the power reallocation and power headroom reporting).

Additionally, the cross link (XL) may share the frequency band applied on the LTE downlink or uplink, for example, an in-band configuration, or adopt a different frequency band that may be separated from the LTE band, for example, an out-of-band configuration. Both configurations may encounter different types of interference such as in-device interference between the cross link and LTE downlink or uplink operation, in-air interference between the cross links and the LTE downlinks or uplinks in proximity, in-air interference between the cross links in proximity, and the like. In an embodiment, the out-of-band configuration may not be subject to as much in-device and in-air interference between the cross links and LTE links (e.g. since an out-of-band configuration normally may apply adequate frequency spectrum isolation between the cross link band and LTE bands). Thus, in such an embodiment, a device may operate two radio chains each with its own baseband processing and independent FFT.

While in-device interference may be handled primarily with the physical radio component of a device, the in-air interference may further be coordinated and reduced with the help of cross link power control. Moreover, the cross link power control may be used to counteract the dynamic propagation conditions of the cross link to achieve the received energy per bit provided and/or used by the cross link QoS while facilitating battery preservation.

As described herein, to help manage two transmission links, power reallocation (e.g. at a UE) may be provided and/or used. For example, in an embodiment, power control may be performed independently and separately for each physical channel, and when multiple channels may be transmitted in parallel (e.g. simultaneous PUCCH and PUSCH), a total transmit power such as a sum of the power-controlled power of each physical channel may exceed a maximum UE transmit power $P_{CMAX}$. To help control the total transmit power from exceeding the maximum UE transmit power, a power reallocation scheme among PUCCH and PUSCHs according to a pre-defined priority setting may be executed (e.g. via an uplink power control mechanism).

For example, when a UE may have simultaneous PUCCH, PUSCH with UCI on one serving cell and PUSCHs without UCI in the other serving cells, and the total transmit power of the UE may exceed $P_{CMAX}$ (i), the UE may reallocate the power associated with such transmissions based on a priority. According to an example embodiment, the power may be reallocated according to the priority: (1) PUCCH, (2) PUSCH with UCI, and (3) PUSCH without UCI. Thus, the PUCCH may be assigned first with its power-controlled power and the remainder may be assigned to the PUSCH with UCI as shown below in the equation. In one embodiment, the $P_{PUSCH\ with\ UCI(i)}$ may be the power-controlled power of the PUSCH.

$$P_{PUSCH\ with\ UCI}(i) = \min\{P_{PUSCH\ with\ UCI}(i), (P_{CMAX}(i) - P_{PUCCH}(i))\}[dBm]$$

Additionally, in an embodiment, the remainder thereof (e.g. what may be left of the total power) may be evenly distributed to the PUSCHs without UCI. The scaling factor w(i) may be applied to adjust the PUSCH power relative to its power-controlled level to ensure the total transmit power may not exceed $P_{CMAX}$ (e.g. as shown by the following equation).

$$\Sigma w(i) \times P_{PUSCHs\ without\ UCI}(i) = P_{CMAX}(i) - P_{PUCCH}(i) - P_{PUSCH\ with\ UCI}(i)[dBm]$$

The same priority may apply for simultaneous transmission of other PUCCH and PUSCH combinations (e.g. PUCCH and PUSCHs without UCI and PUSCH with UCI and PUSCHs without UCI).

For a device-to-device (D2D)-capable UE, the power reallocation may include handling or managing cross link physical channels, for example, since the cross link transmission may share the $P_{CMAX}$ with the uplink transmission. Different power reallocation schemes that may include or take into account the cross link may be used for different configurations with regard to simultaneous XL and UL transmissions and also simultaneous XPCCH and XPDCH transmission. For example, the uplink transmission and cross link transmission may be scheduled exclusively (e.g. no simultaneous uplink and cross link transmissions in a given sub-frame). Such a scheduling may help address certain interference issues particularly for the uplink in-band configuration where the cross link applies the uplink subcarrier resources. The power reallocation scheme may also be simplified, for example, as it may handle UL channels or XL channels in a given sub-frame (e.g. not both).

The simultaneous UL and XL transmission may also occur in the case where a UE may either transmit a preamble or a PUSCH carrying MSG3 in an on-going RACH procedure. The MSG3 transmission may be scheduled by the shortened uplink grant carried in a Random Access Response (RAR) in response to the RACH preamble. The RACH procedure described herein may be used in one or more of the following: to send new uplink data or control information, e.g. an event-triggered measurement report, when a UE may be in a RRC CONNECTED state but may not be uplink-synchronized; to transmit HARQ acknowledgement in the uplink when a UE may be in a RRC CONNECTED state, receives new downlink data, but may not be uplink-synchronized; to handover to a target cell when a UE may be in RRC CONNECTED state; to transition from a RRC IDLE state to a RRC CONNECTED state, e.g. tracking area update; to recover from a radio link failure (RLF); and the like.

According to an example embodiment, a XL transmission may occur, for example, when a UE may be in a RRC CONNECTED state, but may not be uplink-synchronized and uplink or control information may be sent and/or when a UE may be in RRC CONNECTED state and HARQ may be transmitted in an uplink. In such an embodiment, simultaneous UL and XL transmission may include the simultaneous transmission of XL and the PRACH (e.g. preamble) as well as the PUSCH carrying MSG3. Thus, the power reallocation may further take into account PRACH and PUSCH carrying L1/L2 control signaling, which, for example, may include both PUSCH carrying UCI and PUSCH carrying MSG3. In addition, the UL SRS transmission may occur simultaneously with XL transmission.

Additionally, the power reallocation may take into consideration the simultaneous XPCCH and XPDCH transmission. For example, in an embodiment, the XPCCH may be transmitted without XPDCH (e.g. when carrying a XCI for channel state feedback or a HARQ acknowledgement). XPDCH may also be transmitted alone (e.g. when the scheduling information of the XPDCH may be centrally controlled by the network which informs both UEs in the AT application via a downlink DPCCH). As such, according to an example embodiment, the UEs may transmit the XPDCH without accompanying control information.

According to an additional embodiment, XPNDCH may not be power controlled and may instead be transmitted with a pre-configured common power level such that UEs may derive path loss information from a neighbor discovery process. Moreover, XPNDCH may not be transmitted simultaneously with XPCCH or XPDCH. Based on the neighbor discovery process in an application such as an AT application, the XPNDCH may be given highest priority when simultaneously transmitted with UL transmission.

As such, based on the embodiments described herein, a preliminary power reallocation with XL may apply a priority setting as listed in Table 1 below.

TABLE 1

| | Power Reallocation with XL | | |
|---|---|---|---|
| Configurations | No simultaneous XPCCH and XPDCH | Simultaneous XPCCH and XPDCH | With XPNDCH |
| No simultaneous XL and UL | UL channel power reallocation according to Rel10 rules. No XL channel power reallocation (either XPCCH or XPDCH in one sub-frame) | UL channel power reallocation according to Rel10 rules. XL channel power allocation in the order of 1. XPCCH 2. XPDCH | UL channel power reallocation according to Rel10 rules. No XL channel power reallocation (XPNDCH) |
| Simultaneous XL and UL | The combined UL/XL channel power allocation in the order of 1. PUCCH 2. PUSCH with L1/L2 control signaling 3. XPCCH 4. PUSCH without L1/L2 control signaling | The combined UL/XL channel power allocation in the order of 1. PUCCH 2. PUSCH with L1/L2 control signaling 3. XPCCH 4. PUSCH without L1/L2 control signaling | The combined UL/XL channel power allocation in the order of 1. XPNDCH 2. PUCCH 3. PUSCH with L1/L2 control signaling 4. PUSCH without L1/L2 control |

TABLE 1-continued

Power Reallocation with XL

| Configurations | No simultaneous XPCCH and XPDCH | Simultaneous XPCCH and XPDCH | With XPNDCH |
| --- | --- | --- | --- |
| | 5. SRS<br>and<br>1. PRACH<br>2. XPCCH<br>in sub-frames with XPCCH and<br>1. PUCCH<br>2. PUSCH with L1/L2 control signaling<br>3. PUSCH without L1/L2 control signaling<br>4. XPDCH<br>5. SRS<br>and<br>1. PRACH<br>2. XPDCH<br>in sub-frames with XPDCH. | 5. XPDCH<br>6. SRS<br>and<br>1. PRACH<br>2. XPCCH<br>3. XPDCH | signaling<br>5. SRS<br>and<br>1. XPNDCH<br>2. PRACH<br>Note the XPNDCH can be set at a low power level and its high prioritization may have a small impact on the UL transmission. |

The total power therefore may be assigned according to the priority setting to each present physical channel and the power level determined by the power control of each physical channel may be scaled in accordance with the availability of the power resources.

The power reallocation (e.g. the result thereof or output therefrom) may also be used to handle the power imbalance between UL and XL transmission when both links may share the same power amplifier (PA), for example, for an in-band cross link configuration. For example, the UL and XL transmissions may use different uplink sub-carriers, but may pass through the same PA and a large difference between the power of UL sub-carriers and that of XL sub-carriers may degrade the PA efficiency. After the power reallocation, a UE may report such a power imbalance as a type of event such as a new pre-defined event when, for example, the power difference may exceed a pre-set threshold. According to an embodiment, network scheduling may take this power imbalance into consideration and adjust the uplink grant or/and the XL maximum transmit power decision to correct the situation. Additionally, in response to a large power difference between the UL and XL sub-carriers, the multiplexing of UL and XL may be changed from simultaneous to time multiplexed.

In an embodiment, a XL and/or UE maximum power may be provided and/or used. For example, a UE and/or network component may determine an XL and/or UE nominal maximum power. In such an embodiment, the total sum of the multiple physical channels that may be transmitted in parallel on different component carriers and/or different links (UL/XL) over transmitting antennas or a portion thereof (e.g. XL may have dedicated antennas) may not exceed the maximum power $P_{CMAX}$. Also, the power control may be first capped at the maximum transmit power configured at the component carrier level, i.e. $P_{CMAX,c}$. A UE in the AT applications may set the cross link maximum power $P_{CMAX,XL}$ according to the following equations:

$$P_{CMAX\_L,XL} \leq P_{CMAX,XL} \leq P_{CMAX\_H,XL}$$

and $$P_{CMAX\_L,XL} = \text{MIN}\{P_{EMAX,XL} - \Delta T_{C,XL}, P_{PowerClass} -$$
$$\text{MAX}(MPR_{XL} + AMPR_{XL} + \Delta T_{1B,XL}, PMPR_{XL}) - \Delta T_{C,XL}\}$$

$$P_{CMAX\_H,XL} = \text{MIN}\{P_{EMAX,XL}, P_{PowerClass}\}$$

where $P_{EMAX,XL}$ may be the value given by IE P-Max. In an embodiment, such a configuration may be used on a per-carrier frequency and the cross link may be configured similarly. $P_{PowerClass}$ may be the maximum UE power. The cross link Maximum Power Reduction $MPR_{XL}$ and Additional Maximum Power Reduction $AMPR_{XL}$ may be specifically for the XL band configuration or if applicable the values for XL in-band configuration and for XL out-of-band configuration may be used. Power-management Maximum Power Reduction $PMPR_{XL}$ may be the cross link specific power management term based on the XL band selection. Additionally, $\Delta T_{C,XL}$ may be 1.5 dB or 0 dB when a parameter (e.g. as described herein) may apply to the cross link band. $\Delta T_{1B,XL}$ an may be additional tolerance for the cross link.

To determine the total UE maximum power $P_{CMAX}$, different UL and XL configurations may be taken into consideration as described herein. For example, simultaneous UL and XL transmission may not be taken into consideration. In such an embodiment, for the UL transmission sub-frames, the $P_{CMAX}$ may be calculated as described herein or according to current specifications such as a 3GPP Rel-10 specification. Additionally, in the XL transmission sub-frames, $P_{CMAX\_L} \leq P_{CMAX} \leq P_{CMAX\_H}$ where $$P_{CMAX\_L} = P_{CMAX\_L,XL}$$

$$P_{CMAX\_H} = P_{CMAX\_H,XL}$$

The UE maximum power may, thus, be either the maximum uplink power or the maximum cross link power in their respective transmission sub-frames.

Additionally, simultaneous UL and XL transmission may be taken into consideration (e.g. to determine the UE maximum power). In such an embodiment, for XL in-band configuration, the cross link may be a special case of intra-band carrier aggregation with multiple serving cells. Furthermore, the UL and XL may have identical MPR, AMPR and/or PMPR values and the $P_{CMAX}$ may be $$P_{CMA\_L} \leq P_{CMAX} \leq P_{CMAX\_H}$$

-continued where $$P_{CMAX\_L} = \text{MIN}\{10\log10(\sum P_{EMAX,c} + P_{EMAX,XL}) - \text{MAX}(\Delta T_{C,XL}, \Delta T_{C,c}),$$
$$P_{PowerClass} - \text{MAX}(MPR + AMPR, PMPR) - \text{MAX}(\Delta T_{C,XL}, \Delta T_{C,c})\}$$
$$P_{CMAX\_H} = \text{MIN}\{10\log10(\sum P_{EMAX,c} + P_{EMAX,XL}), P_{PowerClass}\}.$$

The summation of $P_{EMAX,C}$ may include the UL CA intra-band configuration and the $P_{EMAX}$ values may be converted to linear scale from the dBm scale may be used in the RRC signaling for the summation. Also, the total may be converted back to dBm value for one or more additional operations. The $\Delta T_C$ value that may be used may take the highest of the uplink serving cells and the cross link.

In such an embodiment, for an XL out-of-band configuration, the cross link may be a special case of inter-band carrier aggregation with multiple serving cells. Additionally, the UL and XL may have different MPR, AMPR and PMPR values and the $P_{CMAX}$ can be $$P_{CMAX\_L} \leq P_{CMAX} \leq P_{CMAX\_H}$$

where $$P_{CMAX\_L} = \text{MIN}\{(\sum P_{CMAX,c} + P_{CMAX,XL}), P_{PowerClass}\}$$
$$P_{CMAX\_H} = \text{MIN}\{10\log_{10}(\sum P_{EMAX,c} + P_{EMAX,XL}), P_{PowerClass}\}$$

and $$P_{CMAX,XL} = \text{MIN}\{P_{EMAX,XL} - \Delta T_{C,XL}, P_{PowerClass} - MPR_{XL} - AMPR_{XL} - \Delta T_{C,XL} - \Delta T_{1B,XL}, P_{PowerClass} - PMPR_{XL} - \Delta T_{C,XL}\}$$
$$P_{CMAX,c} = \text{MIN}\{P_{EMAX,c} - \Delta T_{C,c}, P_{PowerClass} - MPR_c - AMPR_c - \Delta T_{C,c} - \Delta T_{1B,c}, P_{PowerClass} - PMPR_c - \Delta T_{C,c}\}$$

The parameter definitions may also be the same as those applied in, for example, the $P_{CMAX,XL}$ calculation.

As such, a UE such as a UE running an AT application may derive the $P_{CMAX,XL}$ and $P_{CMAX}$ as described herein (e.g. above) based on the UE's power class, the signaled maximum power, one or more of the MPR, AMPR, and/or PMPR that may be applicable to the UL band and the XL band, and/or the tolerances that may be used.

Additionally, in an example embodiment, XL maximum power control may be provided and/or used to manage the power control associated with simultaneous transmissions or links. For example, a nominal cross link (XL) maximum power $P_{CMAX,XL}$ may be determined by the UE and/or a network component. According to an embodiment, the XL maximum power $P_{CMAX,XL}$ may be determined (e.g. calculated) in a similar manner as a component carrier maximum power. However, the cross link may have a different interference situation than that of the uplink and, as such, the cross link maximum power may be used by the network to optimize the cross link resource utilization efficiency and coordinate inter-cross-link interferences. For example, two neighboring or close-by cross links may be allocated with identical resources as long as the maximum power of both cross links may be controlled so as not to interfere with each other. The XL maximum power control (XLMPC) may thus be used to facilitate space division multiple access (SDMA) for cross links.

According to an embodiment, the XLMPC may apply an additional semi-static power control on the $P_{CMAX,XL}$ such that the determined maximum XL power or nominal level, $P_{CMAX,XL}$, may be the upper bound for XLMPC and the applicable maximum XL power level (e.g. that may be signaled or established by the network as described herein such as a semi-static value derived by a network algorithm or calculated or reported based on metrics of the XL) may be controlled and signaled by the network in a semi-static fashion. The XLMPC may be particularly useful in a semi-static grant scheme where the dynamic per-TTI scheduling and power control may be performed or done by the UEs.

Additionally, the XL maximum power level may be updated to, for example, maximize the capacity of certain XLs given the operational conditions in terms of the interference level, battery level, power head room, XL channel state information, a long-term XL capacity reporting in terms of achieved spectral efficiency in terms of bit/s/Hz (e.g. which may either be short-term such as per TTI value or long-term such as an average long-term power headroom) as described herein (e.g. below). To update the XL maximum power level, at least one of the following may be signaled to a UE. For example, in one embodiment, a P-Max information element (IE) in a dedicated RRC signaling may be used and/or reused where the adjustment of P-Max may lead to a new $P_{CMAX,XL}$ based on one or more calculates (e.g. a suitable calculation as described herein).

According to another example, an explicit maximum XL power level in a semi-static grant in connection with a semi-static scheduling scheme of the cross link may be signaled. In such an embodiment, the maximum XL power level may be included in or part of the resources that may be allocated to the cross link in the cross link grant. The grant, which may be the $P_{CMAX,XL}$ level, may be carried in dedicated RRC signaling, a new MAC CE, new DCI formats in PDCCH, and the like.

In another example embodiment, an explicit maximum XL power level in a RRC IE such as a new RRC IE including, for example, a CrossLinkPowerControl element may be used to signal semi-static parameters that may be provided in XL dynamic power control (XLDPC). According to an embodiment, the new IE may reuse the structure of RRC IE UplinkPowerControl. Additionally, the XLMPC and XLDPC parameters (e.g. at least a portion thereof) may be carried in dedicated RRC signaling.

According to an additional example embodiment, an initial value in the RRC dedicated signaling may be provided and/or used to signal a XL maximum power level. In such an embodiment, a DCI format such as a new DCI format to carry relative adjustment commands similar to the TPC bits may subsequently be used and/or provided to adjust the XL maximum power level.

As such, in example embodiments, the XLMPC may operate at a slower rate than the XLDPC, but it may enable the cross link maximum power level to be updated more often than the current component carrier maximum power level may be. This may provide the network with more flexibility in managing the cross links.

Additionally, the XLMPC may be determined by one or more algorithms at the eNB based on a range of parameters including, for example, the available cross link bandwidth, QoS request, buffer status, interference measurement, cross link capacity (bits/Hz/s), power headroom, battery level, etc. For example, in the case of semi-statically allocated resources, the network may maintain, on average, a small positive power headroom to ensure the UE may achieve the required throughput without using excessive power. Also, if a cross link may be assigned with more bandwidth, the maximum power level may be increased accordingly.

Based on a semi-static nature of the XLMPC, long-term measurements may further be reported by the UE to support the feature. For example, the filtered or averaged cross link signal and interference measurement may provide the network with information about potential interfering cross links whose maximum cross link power may be reduced. Also, a long-term average power headroom, especially in the case of semi-static scheduling with fixed bandwidth, may inform the network whether the assigned maximum cross link power may be used efficiently.

Such long-term measurements may be requested, configured, and reported similar to the RRC type measurements carried in uplink data channel. The network may assign an uplink grant for the reporting when the measurement may be requested.

In an embodiment, the XLMPC may regulate the maximum cross link power and may not affect the XLDPC that may operate on a per-TTI basis (e.g. except by changing the level where the cross link transmit power may be capped). As such, the cross link power control, especially when the cross link applies semi-static scheduling, may have at multiple (e.g. two) levels of power control. A first level of power control may include the cross link maximum power control (XLMPC) where a $P_{CMAX,XL}$ level may updated by the eNB and applied in a pre-arranged period such as on a semi-static basis. In such an embodiment, the nominal $P_{CMAX,XL}$ may be the upper bound, i.e. the network may not configure a $P_{CMAX,XL}$ higher than the nominal level.

A second level of power control may include the cross link dynamic power control (XLDPC) where a cross link physical channel that may transmit power per TTI may be calculated per cross link physical channel according to a pre-defined algorithm. In such an embodiment, the sum of the transmit power of physical channels may not exceed the maximum level regulated by the XLMPC or power reallocation and scaling within the cross link may be performed.

As described herein, such embodiments may provide a centralized and/or a semi-static distributed scheduling scheme. In the centralized dynamic scheduling scheme, the network may accordingly perform the dynamic power control and may not need the XLMPC. In this case, the nominal $P_{CMAX,XL}$ may be used without semi-static adjustment.

In the semi-static distributed scheduling, the power control may be administered to facilitate an efficient utilization of power resources by the adjustment of the maximum cross link power while maintaining the QoS. For example, a transmitting UE may calculate a maximum MCS according to the assigned maximum power and the dynamic power control formula when the assigned bandwidth may be applied unchanged. The subsequent data transmissions may result in a BLER ratio for a pre-defined period measured at the receiving UE. The receiving UE may generate TPC commands based on the BLER ratio to regulate the power and a consecutive number of unidirectional TPC commands may trigger a power head room reporting (PHR). For example, when the power may be more than required to deliver the MCS, the receiving UE may send a number of consecutive DOWN TPC commands, which may be pre-defined as a PHR trigger and the transmitting UE may report the power headroom to the eNB, which may in turn reduce the maximum cross link power in the next grant. Alternatively, a threshold of power adjustment in a specified period of time may be used to trigger PHR. This may enable PHR to occur even when the power adjustment may not be monotonic.

Additionally, XL dynamic power control may also be provided and/or used. For example, depending on whether or not a UE may have autonomy in executing the functionality, the cross link dynamic power control (XLDPC) may have two schemes. In a centralized XLDPC (C-XLDPC) scheme, UEs may not be given autonomy. The XL transmission may occur upon receiving an XL grant issued on a sub-frame basis. The cross link physical channels may be power-controlled in a similar manner as what may be specified in LTE baseline uplink power control. The cross link may be a special case of a component carrier. Additionally, in such an embodiment, the UE may not have autonomy in determining power control parameters and may calculate the transmit power based on parameters received from the network. The scheme may be tied to a dynamic per-TTI and centralized scheduling scheme and the XPCCH may not be applicable.

In a distributed XLDPC (D-XLDPC), UEs may be given a certain degree of autonomy. The cross link transmission may be granted and configured by the network on a semi-static basis. During the semi-static period, a UE may autonomously perform cross link dynamic power control such that the UEs may derive the used required parameters (e.g. at least a portion thereof) in calculating the channel transmit power. For example, the UE may derive and transmit TPC bits or may determine the desired target power level (used as the open loop operating point) based on interference measurements. This scheme may further be tied to a semi-static and distributed scheduling scheme described herein. Both schemes may use one or more of the power control parameters described herein.

Additionally, an XPDCH power determination may be made and/or used. For example, in an embodiment, the XPDCH transmit power of sub-frame i may be calculated according to the equation or equations below. In particular, in an embodiment, the XPCCH power subtraction may be applicable when the XPCCH and XPDCH may be transmitted simultaneously and may be calculated as follows:

$$P_{XPDCH}(i) = \min\{P_{CMAX,XL}, 10\log_{10}(BW_{XPDCH}(i)) +$$
$$P_{O\_XPDCH} + \alpha_{XL} PL + \Delta_{TF\_XL}(i) + TPC_{XL}\}[dBm]$$

or $$P_{XPDCH}(i) =$$
$$\min\{P_{CMAX,XL} - P_{XPCCH}(i), 10\log_{10}(BW_{XPDCH}(i)) + P_{O\_XPDCH} +$$
$$\alpha_{XL} PL + \Delta_{TF\_XL}(i) + TPC_{XL}\}[dBm]$$

In an example embodiment, the $P_{CMAX,XL}$ may be set as described herein or semi-statically controlled. Additionally, the bandwidth, $BW_{XPDCH}(i)$ may be the transmission bandwidth scheduled in sub-frame i. According to an embodiment, the bandwidth may be specified in the dynamic per-TTI XL grant or semi-static grant. Furthermore, $P_{O\_XPDCH}$, which may be the nominal power level, may be a desired and/or target UE specific power level given the interference level. The cross link path loss, PL, may be estimated by the UEs where $\alpha_{XL}$ may be the fractional path loss compensation factor, which for uplink power control may be used by the network to trade-off between the uplink scheduling fairness and total cell capacity and/or the full path loss compensation (i.e. $\alpha_{XL}=1$) may maximize the fairness for cell-edge UEs at the expense of higher inter-cell interference. In an embodiment, such a feature may not be applicable to the cross link, but the parameter may be kept for further consideration. Additionally, the value of $P_{O\_XP\_DCH}$ +PL may denote the basic open loop operating point. The $\Delta_{TF,XL}(i)$ may be a pre-defined function that derives the required BPRE based on assigned number of block, block size, assigned number of resource elements, Kr, Ks, etc. It may, in an embodiment, give the desired power to achieve the SINR given the Transport Format (TF) scheduled in the sub-frame i. $TPC_{XL}$ may be a dynamic offset algorithm either being accumulative or absolute with pre-defined power adjustment step based on the received TPC commands for XPDCH.

Additionally, in an embodiment, the initial $P_{XPDCH}$ may be based on the initial scheduled transmission parameters. For example, when the cross link may be established, the UEs may start with transmitting the cross link reference signal. Such a cross link reference signal may be used for XPCCH channel estimation and also for cross link CSI generation. In a centralized scheduling scheme, the CSI that may be reported to the network in the UL may be used to derive the initial XL grant including the bandwidth and the MCS. The UE, upon receiving the grant, may calculate the initial power accordingly. Such a cross link reference signal may also be used with a distributed scheduling scheme. In such an embodiment, the UE may determine the bandwidth and the MCS based on the CSI reported on the XL.

When the $P_{XPDCH}$ may exceed the $P_{CMAX,XL}$ the $P_{CMAX,XL}$ may be used such that the XPDCH power level may be scaled down. Also, in an embodiment, when simultaneously transmitted with XPCCH, the XPDCH may be scaled down when the remainder of cross link power after XPCCH power assignment may be less than the $P_{XPDCH}$. When performing and/or providing XLDPC, a UE may detect the wind-up effect with the help of pre-defined criteria such as a minimum and/or maximum power detection.

According to another embodiment, an XPCCH power determination may be made and/or used. For example, the XPCCH transmit power of sub-frame i may be calculated according to the following:

$$P_{XPCCH}(i)=\min\{P_{CMAX,XL}(i), P_{O\_XPCCH}+PL+\Delta_{TF\_XL}(XCI)+TPC_{XL}\}[dBm]$$

where the $P_{CMAX,XL}$ may be suitably set or semi-statically controlled. $P_{O\_XPCCH}$ (i.e. the nominal power level) may be the desired/target UE specific power level given the interference level. This power level may be different than the $P_{O\_XPDCH}$. The cross link path loss, PL, may be estimated by the UEs. The same path loss may be used for both XPDCH and XPCCH power control. Additionally, control channels may normally apply full path loss compensation. The value of $P_{O\_XPDCH}$+PL may denote the basic open loop operating point, which may differ from that of the XPDCH, as the XPDCH and XPCCH may have different multiple access schemes and also different target levels. The $\Delta_{TF,XL}(i)$ may be a pre-defined function that may derive the BPRE based on the pre-defined XCI format carried in XPCCH (e.g. the number of information bits) the number of CRC bits, coding rate, and the like. In an embodiment, the $\Delta_{TF,XL}(i)$ may give the power to achieve the target error rate for the XPCCH format carried in the sub-frame i. Additionally, $TPC_{XL}$ may be a dynamic offset algorithm either being accumulative or absolute with pre-defined power adjustment step based on the received TPC commands for XPCCH.

In such an embodiment (e.g. to determine XPCCH power), the initial XPCCH power level may start with the open loop operating point plus the dynamic offset corresponding to the XCI format. Alternatively, the initial XPCCH power level may add another pre-defined offset to ensure successful initial XPCCH reception before the channel condition and interference situation may be reported.

Additionally, there may be certain type of XPCCH that may not apply the XLDPC. For example, the XPCCH may carry the XLDPC parameters such the $P_{O\_XPCCH}$, the TPC bits, and the like. This type of XPCCH may apply the XLMPC (i.e. may be transmitted with a configured allowed maximum cross link power).

An XLRS power determination may also be made and/or used as described herein. According to an example embodiment, a XLRS may include one or different types of reference symbols (RS). For example, the XLRS may be e.g. XL specific RS (XLSRS) that may be transmitted when the cross link may be established. Such a XLRS may be applied for a variety of purposes including cross link signal measurement, channel estimation for XPCCH decoding, initial cross link timing acquisition, and the like. In such an embodiment, the XLRS may not apply XLDPC. Instead, it may be transmitted with a fixed power level configured when the cross link may be established (e.g. at $P_{CMAX,XL}$ where it may follow the XLMPC that may be applied). There may be also demodulation RS (DMRS) transmitted together with XPDCH to help with XPDCH decoding. Such demodulation RSes may be set at the same power as the $P_{XPDCH}$ controlled by the XLDPC.

As described herein, a nominal power level may be provided and/or used in an embodiment. For example, the $P_{O\_XPDCH}$ and $P_{O\_XPCCH}$ may denote the desired or target power level that may be used for certain BLER operating point. They may be set, for example, based on the received interference level and thermal noise power.

In a C-XLDPC scheme, the network semi-statically may provide the $P_{O\_XPCCH}$ and $P_{O\_XPDCH}$ in the dedicated RRC signaling similarly as the equivalent nominal power level used in uplink power control. For the network to determine the nominal levels, the UEs may report the received interference level and thermal noise power in various (e.g. new) types of RRC measurement reporting carried in PUSCH. The measurements may be similar to the LTE uplink receive interference and thermal noise power measurements. The network may request and configure the measurements and may provide uplink grant for the measurement result reporting.

In a D-XLDPC scheme, the UEs in the AT application may determine the nominal levels autonomously. The same interference level and thermal noise measurements may be applied and based on the measurement results the UE may derive the $P_{O\_XPDCH}$ and $P_{O\_XPCCH}$ and may send them over the cross link in XPCCH. Given the semi-static nature of this parameter, it may also be transmitted in XPDCH using a new MAC Control Element or via RRC signaling.

A transmission format (TF) may further be provided and/or used. The transmission format (TF) may include the bandwidth and MCS which may be applied in the power calculation to ensure the resulting power may provide the required SINR. In a C-XLDPC scheme, the TF may be transmitted as described below.

In an example embodiment, the TF may be transmitted by cross link control information (XCI) format carried in a PDCCH. The XCI and DCI may be both decoded with C-RNTI. Additionally or alternatively, the XCI may apply a XL-RNTI.

The TF may further be transmitted in DCI format 0 or DCI format 4 (e.g. with multi-antenna port transmission). Such an embodiment may enable the existing DCI format for cross link scheduling and, in particular, for the uplink in-band cross link band configuration to be reused. To distinguish XCI and DCI, the XL-RNTI may be used (e.g. considered).

According to an embodiment, the inclusion of XCI may enable more PDCCH capacity and may also increase the UE blind decoding effort, but the low latency and robustness of PDCCH may be beneficial for the C-XLDPC scheme. The network may use cross link CSI reports on PUCCH and PUSCH to help determine the TF. For example, the cross link CQI may be multiplexed with PUSCH when an uplink grant may be available. The network may pre-allocate an uplink grant when requesting the XL CQI in PDCCH. The XL CQI may also be transmitted in PUCCH similarly as DL CQI reporting. A format (e.g. a new format) of PUCCH may be assigned for the XL CSI or PUCCH format 2 may be reused.

Additionally, in an embodiment, the D-XLDPC scheme may not use XCI on PDCCH, as the TF information may be exchanged on the cross link between the UEs. Instead, the TF information may be carried in XCI on the XPCCH. The cross link CSI that may be carried on XPCCH may be used to determine the TF. However, such an embodiment, may use and/or have some network scheduling functionality that may reside in the UEs.

A path loss (PL) estimation may be made and/or used. The cross link path loss (PL) may be estimated by the UE and applied in the power calculation without reporting it to the network in both C-XLDPC and D-XLDPC. The PL may be estimated by UEs with the help of measurements based on factors as described below.

In one example factor, the measurements may be based on neighbor discovery beacon detection. The ND beacon may be transmitted with a cell-specific configured power level, which combined with the detected beacon level may vie the path loss. The neighbor discovery may be triggered by pre-defined events, e.g. the path loss updates or it may be a periodical update. In embodiment, the ND beacon level may be broadcast to the UEs.

In another example factor, the measurement may be a cross link reference signal measurement. The cross link reference signal may be configured to transmit at a known level and combined with the received signal strength (e.g. measurement may use further investigation with more details) it may give the path loss. This may also use the cross link reference signal to be transmitted with a known level signaled, e.g., via dedicated RRC signaling or MAC signaling from the network or the cross-link. In the C-XLDPC scheme, it may be signaled in similar to the CRS power level of the reference cell that may be used in the path loss estimation for the uplink power control. In the D-XLDPC scheme, the reference signal level may be included in the cross link grant in the semi-static scheduling or separately signaled. Additionally, the path loss may be compensated for in both XPCCH and XPDCH transmit power.

As described herein, transmit power commands may be provided and/or used. The TPC commands may be applied in accumulative and absolute modes. The accumulative commands may be relative to the previous transmit power and the absolute commands may be relative to the base operating point (e.g. more suitable for intermittent UE transmission). The cross link power step size may be similar to a base line such as an LTE baseline, i.e. {−1, +1} dB and {−1, 0, +1, +3} dB for the accumulative mode and {−4, −1, +1, +4} dB for the absolute mode. Different step sizes may be also adopted, e.g. a 2 dB step size.

In the C-XLDPC, the TPC bits may not be transmitted on the cross link and may be transmitted from the eNB in the LTE downlink in the XCI together with the scheduling information, e.g. reusing DCI format 0 or DCI format 4 where uplink grants may be sent along with the TPC bits. These TPC may be applicable for the XPDCH. As mentioned earlier, the XCI may be decoded using C-RNTI or XL-RNTI. In another example, it may be in a dedicated XCI format for TPC transmission, e.g. reusing DCI format 3/3A decoded by TPC-PUSCH-RNTI/TPC-PUCCH-RNTI. The XL can apply also TPC-XPDCH-RNTI and TPC-XPCCH-RNTI when decoding the XCI.

In the D-XLDPC scheme, the TPC bits may be transmitted in XPCCH or in a separate non-power-controlled type of XPCCH using the maximum cross link power, or other specified initial cross link power configured by higher layers. A separate non-power-controlled XPCCH may be used to help prevent potential race conditions where both UEs may send TPC commands to regulate the XPCCH carrying the TPC.

In the C-XLDPC scheme, a network component such as an eNB may determine the TPC based on the received SINR of the cross link reference signal. Such a measurement (e.g. the SINR) may be already used by cross link mobility and may be available for TPC derivation. Additionally, such a measurement may be an RRC type measurement request and configured by the eNB. The averaged and filtered result associated therewith may be reported in PUSCH in the form of MAC PDU. In an embodiment, the network may also assign an uplink grant for the measurement report at the request of RRC.

According to an additional embodiment, the TPC may be based on the BLER of the XPDCH. Such a measurement (e.g. the BLER that may be used) may be a periodical BLER counting based on XPDCH ACK and/or NACK. In this embodiment, the C-XLDPC may be applied in connection with the centralized dynamic scheduling where the ACK and/or NACK of XPDCH may be reported to the eNB. The BLER may be derived from the XL HARQ acknowledgement. In an example embodiment, the BLER may be an RRC type measurement request and configured by the eNB. The averaged and filtered result may be reported in PUSCH in the form of MAC PDU.

Furthermore, in the C-XLDPC, a UE may determine the TPC based on the measurements described above along with an eNB power control algorithm that may be implemented in the UE. For example, the TPC may be primarily used to dynamically adjust the operating point and may not be periodical. As such, the TPC rate may be adjusted according to the power control algorithm.

Alternatively or additionally, in an embodiment, the TPC may be received from either a downlink channel or a cross-link channel. For example, the D-XLDPC may be in charge of the path loss and local interference compensation while the C-XLDPC may be in charge of interference compensation at a larger level (e.g. the eNB may use measurement reports from a set of UEs involved in concurrent D2D links). In that embodiment, one or more rules may be defined to avoid possible races between the two schemes. For example, the eNB may decide to decrease the power (e.g. because of its own knowledge of the cell interference level) while the D-XLDPC may increase the current power (e.g. because of current D2D link status).

According to an example embodiment, a selected granularity based on or in terms of measurement periodicity, update rate, and/or power step may be different for the schemes. For example, the C-XLDPC scheme may provide updates at a slower rate and with a coarser power step granularity than the D-XLDPC scheme where such updates may be periodic or aperiodic. Additionally, the C-XLDPC scheme may define an operating power level respecting the general interference level while the D-XLDPC works around this power level to manage path loss and local interference variations.

According to a further embodiment, when a TPC may be provided by the eNB, the D-XLDPC may be interrupted during a given period. If the D-XLDPC may follow an accumulation strategy, an accumulation may be reset (e.g. at this point). In an embodiment, the accumulation strategy may include or refer to a dynamic offset parameter such as a $TPC_{XL}$ as described herein. In the accumulation mode or strategy, the computation of a TPC may rely on its precedent value ($TPC_{XL}$ (i-1)) whereas in the absolute mode, the computing of a TPC may be an absolute offset that may be applied. The mode (e.g. accumulation or absolute) that may be used may be provided by higher layers. The eNB may also provide a Tx reference power in the TPC. At the end of the period, the D-XLPC may restart from the new operating point defined by the C-XLDPC.

Additionally, the length of the interruption period may be defined based on the C-XLDPC strategy and implementation to avoid transient effects generated by the power update (e.g. it may be a static parameter defined by design or provided by RRC or a dynamic parameter provided in the TPC). For example, the eNB may use a few subframes to provide TPCs to several UEs and may want to make sure that each updated power level may have been applied before running D-XLDPC for each link again. This may avoid wasting bandwidth for crosslink TPCs working on transient interference levels and/or avoid getting divergence in the algorithm results. To respect such a rule, different UEs that may be used or involved in a D2D link may decode the TPCs that may be received on the downlink channel so they may be aware of the C-XLDPC and D-XLDPC (e.g. this TPC may be multi-casted on XL-RNTI).

In some embodiments, the eNB may decide to not interrupt the D-XLDPC (e.g. if there may be one D2D link that may be impacted by C-XLDPC). According to such an embodiment, UEs such as the D2D link UEs may still follow other rules (e.g. accumulation reset, new Tx reference, and the like that may be used or provided as described herein) at the subframe that may be defined for the TPC application.

The TPC that may be received on a downlink channel may indicate one or several targeted transmitting UEs. These targeted UEs may be Tx UEs (e.g. as described herein, for example, in the following procedures, actions, or methods). Additionally, other UEs (e.g. that may be involved or used in the D2D link) may be Rx UEs. According to an example embodiment, the Tx and/or Rx modes associated with the UEs may be defined within the TPC context.

For example, a UE involved in a D2D link may scan any TPC sent on downlink channel. Additionally, when a TPC targeted to its D2D link may be identified (e.g. through XL-RNTI), a UE may perform one or more of the following. A UE may identify if a TPC such as a downlink TPC command may indicate or signal whether the UE may be a Tx or Rx UE. According to an example embodiment, this may be performed or done, for instance, by determining whether the RNTI that may be used to mask the CRC of the DCI that includes the command corresponds to the link in which the UE may be the receiver or the transmitter.

If the UE may be a Tx UE, the UE (e.g. the Tx UE) may update its Tx power (e.g. in a relative or absolute mode) based on the downlink TPC command and may ignore a crosslink TPC command during a period of N subframes where N being defined in the TPC command or preliminary provided by higher layers). Alternatively or additionally, the UE may start a prohibit timer of a pre-determined or configured duration. The UE may act on the crosslink TPC commands if the prohibit timer may not be running.

If crosslink accumulation mode may be enabled, a Tx UE may reset it. Additionally, if the UE may be a Rx UE, the UE (e.g. the Rx UE) may stop transmitting a crosslink TPC command to a Tx UE(s) during the period of N subframes. Alternatively or additionally, the UE may start a prohibit timer of a pre-determined or configured duration. The transmission of TPC command may occur if the prohibit timer may not be running.

Also, if a UE may be an Rx UE, the Rx UE may update the Tx reference power based on a value indicated in the downlink TPC for its path loss computation. After the N subframes, the Rx and Tx UEs may restart the send and decode crosslink TPCs A derivation from UL power control may be provided and/or used as described herein. For example, the transmission power used for at least one XL channel or signal, or the sum thereof, may be tied to the transmission power used for an UL channel or signal such as PUCCH, PUSCH or SRS, or to parameters and variables that may be used in the calculation thereof. The UL channel may be a channel in the serving cell in which the cross-link transmission may be taking place. Such linkage between the powers used for XL channels and UL channels may protect a UL operation in the network by limiting interference that may be caused to UL transmissions in the same serving cell or neighboring serving cells.

In an embodiment, the transmission power of the at least one XL channel or signal (PXL) may be derived from the transmission power of at least one UL channel or signal as described herein. For example, according to an embodiment, the nominal cross link maximum transmission power (e.g., $P_{CMAX,XL}$) may be derived from the transmission power of at least one UL channel or signal. In such an embodiment, the actual transmission power that may be used for an XL channel or signal (e.g., such as XPCCH or XPDCH) may be determined according to at least one of the solutions or embodiments described herein (e.g. above) with the parameter $P_{CMAX,XL}$ derived from UL power control as described herein (e.g. below). In particular, the power headroom applicable to the XL channel (or combination thereof) may be calculated with $P_{CMAX,XL}$ derived using such an embodiment. Additionally, such an embodiment may allow or enable the use of a transmission power even smaller than what may be used to protect UL operation, which may be beneficial to reduce interference to other cross-links potentially using the same resources in the network.

Additionally, in the embodiments described herein, the derivation of the transmission power of an XL channel or signal ($P_{XL}$), or of the nominal cross link maximum transmission power ($P_{CMAX,XL}$) may be performed according to at least one of the following. For example, in one embodiment, $P_{XL}$ or $P_{CMAX,XL}$ may reuse at least one of the path loss measurement ($PL_c$) and power control adjustment state ($f_c(i)$) components of the transmit power of an UL channel.

In such an embodiment, $P_{XL}$ or $P_{CMAX,XL}$ may be expressed as the following for subframe i $$P_{XL}(i) = \min\{P_{XL\_MAX}(i), P_{OFFSET,XL}(i) + \alpha_c(j) \cdot PL_c + f_c(i)\}$$

or $$P_{CMAX,XL}(i) = \min\{P_{XL\_MAX}(i), P_{OFFSET,XL}(i) + \alpha_c(j) \cdot PL_c + f_c(i)\}$$

where $\alpha_c(j)$ may be a parameter used in the derivation of transmit power for PUSCH, $PL_c$ may be the downlink pathloss estimate that may be calculated in the UE, and $f_c(i)$ maybe the PUSCH power control adjustment state in subframe i. Alternatively or additionally, the PUCCH power control adjustment state g(i) may be used in place of $f_c(i)$ for at least one cross-link channel or signal. These values may be for a serving cell (c) that may be the serving cell whose UL resources may be used for the cross link transmissions, and the index j may be fixed to a specific value (e.g. 0). In such an embodiment, $P_{XL\_MAX}(i)$ may be a configured maximum transmit power and $P_{OFFSET,XL}(i)$ may be a parameter that may be derived from at least one of: at least one parameter that may be received from higher layers, such as an offset $P_{0,OFFSET,XL}$ and at least one property of the cross link transmission in subframe i, such as the bandwidth, the number of code blocks, the number of control information bits, the number of information bits, the transmission format, and the like. For example, in an embodiment, $P_{OFFSET,XL}(i)$ may be determined as the sum $P_{0,OFFSET,XL} + \Delta_{TF,XL}(i)$ where $\Delta_{TF,XL}(i)$ may be calculated according to embodiments described herein (e.g. above).

In another example, the path loss measurement may be reused while the power control adjustment state $TPC_{XL}$ may remain specific to the cross-link and may be obtained using one of the embodiments described herein above, and.

$$P_{XL}(i) = \min\{P_{XL\_MAX}(i), P_{OFFSET,XL}(i) + \alpha_c(j) \cdot PL_c + TPC_{XL}\}$$

or $$P_{CMAX,XL}(i) = \min\{P_{XL\_MAX}(i), P_{OFFSET,XL}(i) + \alpha_c(j) \cdot PL_c + TPC_{XL}\}$$

Dependency from the latest transmission power that may be used for a discovery signal may be provided and/or used. For example, the transmission power used for at least one cross-link channel or signal may be tied to the transmission power $P_{DIS}$. According to an embodiment, the $P_{DIS}$ may have been used for the latest transmission of a specific discovery signal that may be associated to this cross-link channel. For instance, the transmit power may be determined according to $$P_{XL}(i) = \min\{P_{XL\_MAX}(i), P_{DIS} + P_{OFFSET,XL}(i) + TPC_{XL}\}$$

where $P_{OFFSET,XL}(i)$ may be determined according to a solution similar to the embodiments described herein. In such an example, the UE initial transmit power may be determined based on $P_{DIS}$ and an adjustment $P_{0,OFFSET,XL}(i)$ that may depend on the nature of the cross-link transmission and/or may be subsequently be adjusted based on TPC commands.

In embodiments, multiple power control modes may also be provided and/or used. For example, a solution or embodiment used for determining the transmission power of a cross-link channel or signal (or power control mode) may depend on at least one of the following: the resource in which the cross-link transmission may occur (e.g. expressed in terms of subframes, carrier, or resource block allocations that may be semi-statically or dynamically allocated by the network); the UE with which the cross-link transmission may occur; the type of cross-link channel or signal transmitted (e.g. control channel, data channel or reference signal); an explicit configuration signaled by the network; and the like.

Such different solutions or embodiments may facilitate efficient utilization of network resources for D2D communications. For example, the UE may use a power control mode where the transmit power or maximum transmit power of a cross-link channel may be derived from the uplink power control parameters, as described herein (e.g. above), in subframes where regular uplink transmissions may also occur from the same or other UEs in other resource blocks of the uplink carrier. On the other hand, the UE may use a power control mode independent of uplink power control in subframes where no regular uplink transmission may occur, possibly for a group of cells. For example, the UE may be configured to use a semi-statically configured transmit power in certain subframes.

In embodiments, where multiple power control modes may be simultaneously configured to a UE, for example, as described herein, a power control adjustment such as one or more TPC commands may be associated to a specific power control mode and may be used to affect the adjustment state of this particular mode. One or more parameters that may be used in a power control mode such as TPC step size adjustment may be specifically configured for this mode. Additionally, more than one power control mode may be configured that may use the same formulas and update procedures, but, for example, different values for the associated parameters.

In example embodiments, the power control mode to which the TPC command may be associated may depend on which channel or if applicable DCI format the TPC command may be received from, whether the command may be received from the serving cell or another UE, and of which UE, the subframe in which the TPC command may be received, and the like.

The UE may also report power headroom (e.g. separately) for each power control mode. Additionally, the UE may trigger transmission of a report when the transmission power for a given power control mode may exceed a threshold, or when the power headroom may become or may be lower than a threshold. The report may include a power headroom report signaled at the MAC layer, or of a measurement report signaled at an RRC layer. In example embodiments, the threshold may be provided by higher layers.

According to an embodiment, XL power headroom reporting may also be provided and/or used. For example, the XL power headroom may be a measure of the difference in one sub-frame between the $P_{CMAX,XL}$ and the power-controlled XPDCH transmit power $P_{XPDCH}$ that may be used if there may be no limit of the XL transmit power (e.g. as shown in the equation below).

$$XLPH(i) = P_{CMAX,XL}(i) - (10 \log_{10}(BW_{XPDCH}(i) + P_{0_{XPDCH}} + \alpha_{XL} PL + \Delta_{TF_{XL}}(i) + TPC_{XL}) \text{ [dB]}$$

The foregoing parameters have been discussed in connection with cross link nominal maximum power determination, cross link maximum power control, and the XPDCH power control.

In the C-XLDPC, the eNB may evaluate the cross link scheduling decision, for example, to improve or optimize the combination of MCS and bandwidth in the cross link grant with the help of the XPDCH power headroom reporting performed by UE MAC layer. This power headroom may be similar to the current power headroom that may be applied in the uplink which may be calculated for one sub-frame.

The XLMPC may take the cross link headroom reporting as an input, but given the semi-static nature, an averaged power headroom may be reported on a sub-frame basis. This may be applied in the D-XLDPC where, for example, the granted cross link bandwidth may be similar or the same during the semi-static cross link grant and the UEs schedule MCS and determine TPC autonomously. Given the constant bandwidth, the long-term average power headroom may be used to illustrate or show how power may be utilized in the cross link.

In both C-XLDPC and D-XLDPC schemes, the power headroom may be reported to the network. The long-term average power headroom may be reported similarly as the short-term power headroom in the MAC Control Element. The existing MAC control element for PHR, for example, the Extended Power Headroom MAC Control Element may be used to report the XL PHR. The XL PHR may be concatenated with the PHR for Pcell and Scells in the CA configuration. When a UE may not be configured with CA, the extended MAC CE may further be applied.

Additionally, in example embodiments, various types of power headroom may be used and/or provided in addition to a Type 1 and Type 2 PH and the power headroom types for both UL and XL may be one or more of the following: a Type 1 PH with a UE transmitting PUSCH; a Type 2 PH with a UE transmitting PUSCH and PUCCH simultaneously; a Type 3 PH with a UE transmitting XPDCH; Type 4 PH with a UE transmitting XPDCH and XPCCH simultaneously; and the like.

The XLPHR may also be triggered by a significant change in estimated cross link path loss since the last XLPHR. For example, a similar PathLossChange of phr-Config structure in IE MAC-MainConfig may be reused for the cross link. The XLPHR may further be triggered when more than a configured time may have elapsed since the last XLPHR, for example, when a timer for XLPHR may have lapsed. In an additional example, the XLPHR may be triggered when more than a configured number of closed-loop cross link TPC may have been implemented by the UE. Such an XLPHR may be, for example, unilateral. According to another or additional embodiment, the XLPHR may be triggered when long-term average XLPHR may have exceeded a pre-set hysteresis. For example, the long-term average XLPHR may have been trending in certain negative range and the maximum cross link power may be increased.

The XLPHR may also periodical to facilitate the XLMPC, for example, for the case where the granted bandwidth may be applied unchanged. These configurations may be included in the PHY MAC configuration for the cross link.

UE transmit timing alignment may also be provided and/or used. For example, when UEs (e.g. two UEs) may operate in the AT applications, the UE-to-UE link may operate the cross link according to its own time line with reference to the downlink or uplink timing. For example, the UEs may align the cross link transmit timing with the uplink (e.g. LTE uplink) transmit timing. In an embodiment, aligning the cross link transmission with the uplink transmission may help reduce prevent the uplink transmission of a subsequent sub-frame from overlapping with the cross link transmission of the previous sub-frame due to the timing advance (TA). The maximum TA may be 0.67 ms and, therefore, for a cell-edge UE's uplink transmission, scheduled in sub-frame X, may actually start as early as 0.67 ms before the start of sub-frame X (e.g. 0.33 ms after the start of sub-frame X-1). If this UE may also operate the cross link transmission in sub-frame X-1 and the cross link transmission timing may be aligned with the downlink timing, the cross link transmission may be impacted by interference. The inadvertent uplink bleeding into the cross link transmission may be avoided or reduced when a UE may transmit its UL and XL with the same timing.

To facilitate the receiver with the cross link transmission, both UEs may transmit the XLRS once the cross link may be established and the resource may be allocated. The transmit timing of the XLRS may follow the uplink timing, which may be downlink timing plus the TA. Based on the low mobility and close proximity, their downlink timing may be close to each other, because both may be synchronized with a common downlink timing reference (e.g. the serving cell's Cell-specific Reference Signal (CRS)). In an embodiment, for a UE to receive the XLRS, it may factor in the TA of the other UE.

Additionally, in an embodiment, the network may inform or signal to both UEs of each other's TA when setting up the cross link (e.g. to help with transmit timing alignment). Additionally, the network may apply a new type of MAC CE reusing the structure of the timing advance command MAC CE.

The UE may also apply its own TA such that the UE may align its receiver using its own downlink timing plus its own TA. In such an embodiment, given the close proximity, the two UEs may experience highly correlated propagation conditions in the uplink such that their TAs may be close to each other.

In either embodiment, the UE may apply a small-size searching window around its own uplink timing to locate the start the reference signal, i.e. the transmission timing. Once it may be found, the cross link receiver may lock onto the timing by fine-tracking of the XLRS. The network may also keep informing the TAs to both UEs to maintain the timing alignment. When using the downlink timing for transmission on the cross link, the bleeding issue from uplink to the cross link due to the TA may be difficult to resolve.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of controlling a cross link transmit power level on a wireless transmit/receive unit (WTRU), the method comprising:

selecting a cross link transmit power control (TPC) formula for a cross link transmission from the WTRU to another WTRU, wherein the cross link TPC formula is selected from at least a first cross link TPC formula and a second cross link TPC formula, wherein the first cross link TPC formula is based on a bandwidth of the cross link transmission and path loss information;

determining a cross link transmit power level in accordance with at least the selected cross link TPC formula; and sending, by the WTRU to the other WTRU, the cross link transmission with a cross link transmit power set to the determined cross link transmit power level, wherein the first cross link TPC formula is associated with a first cross link power control mode and the second cross link TPC formula, is associated with a second cross link power control mode.

2. The method of claim 1, wherein the cross link transmit power level is controlled on a per-transmission time interval (TTI) basis.

3. The method of claim 1, further comprising receiving, by the WTRU, an explicit indication in downlink control information, the explicit indication indicating the second cross link TPC formula.

4. The method of claim 3, wherein:
the DCI includes a TPC command; and
the explicit indication is included in the TPC command.

5. The method of claim 1, wherein the cross link transmit power level is determined in connection with a transmission power level of an uplink (UL) channel between the WTRU and a network entity.

6. The method of claim 3, further comprising determining the first one of the plurality of cross link power control modes for use by the WTRU, wherein the first one of the plurality of cross link power control modes is associated with the received explicit indication.

7. The method of claim 1, wherein the first cross link TPC formula is selected in accordance with the first one of the plurality of cross link power control mode.

8. The method of claim 1, further comprising receiving an indication from a network entity, wherein the second cross link TPC formula is selected from a plurality of cross link TPC formulas based on at least the received indication.

9. The method of claim 1, wherein the selected cross link TPC formula is one of: (1) calculated based on the bandwidth associated with the cross link transmission and the path loss information or (2) used semi-statically for more than one subframe.

10. The method of claim 1, wherein the cross link transmit power level in the first cross link TPC formula is determined based on the path loss information, the bandwidth associated with the cross link transmission and one or more parameters obtained via higher layer signaling.

11. A wireless transmit/receive unit (WTRU) comprising:
a transmitter;
a receiver; and
a processor, operably coupled to the receiver and the transmitter, configured to:
select a cross link transmit power control (TPC) formula for a cross link transmission from the WTRU to another WTRU, wherein the cross link TPC formula is selected from at least a first cross link TPC formula and a second cross link TPC formula, wherein the first cross link TPC formula is based on a bandwidth of the cross link transmission and path loss information, and determine a cross link transmit power level in accordance with at least the selected cross link TPC formula; and the transmitter configured to send to the other WTRU the cross link transmission with a cross link transmit power set to the determined cross link transmit power level, wherein the first cross link TPC formula associated with a first cross link power control mode and the second cross link TPC formula is associated with a second cross link power control mode.

12. The WTRU of claim 11, wherein the processor is configured to control the cross link transmit power level on a per-transmission time interval (TTI) basis.

13. The WTRU of claim 11, wherein the receiver is configured to receive an explicit indication in downlink control information (DCI), the explicit indication indicating the second cross link formula.

14. The WTRU of claim 13, wherein:
the DCI includes a TPC command; and
the explicit indication is included in the TPC command.

15. The WTRU of claim 11, wherein the processor is configured to determine the cross link transmit power level in connection with a transmission power level of an uplink (UL) channel between the WTRU and a network entity.

16. The WTRU of claim 13, wherein the processor is configured to determine the first one of the plurality of cross link power control modes for use by the WTRU, wherein the first one of the plurality of cross link power control modes is associated with a received explicit indication.

17. The WTRU of claim 11, wherein the first cross link TPC formula is selected in accordance with the first cross link power control mode.

18. The WTRU of claim 11, wherein the receiver is configured to receive an indication from a network entity, wherein the second cross link TPC formula is selected from a plurality of cross link TPC formulas based on at least the received indication.

19. The WTRU of claim 11, wherein the processor is configured to one of: (1) calculate the selected cross link TPC formula based on the bandwidth associated with the cross link trabsmission and the path loss information or (2) use the selected cross link TPC formula semi-statically for more than one subframe.

20. The WTRU of claim 11, wherein the processor is configured to determine the cross link transmit power level in the first cross link TPC formula based on the path loss information, the bandwidth associated with the cross link transmission and one or more parameters obtained via higher layer signaling.

* * * * *

UNITED STATES PATENT AND TRADEMARK OFFICE
CERTIFICATE OF CORRECTION

PATENT NO. : 10,568,052 B2
APPLICATION NO. : 15/713046
DATED : February 18, 2020
INVENTOR(S) : Tao Deng et al.

It is certified that error appears in the above-identified patent and that said Letters Patent is hereby corrected as shown below:

In the Specification

At Column 2, Line 34, replace "application" with --application.--

At Column 6, Line 8-9, replace "random-access memory" with --random access memory--

At Column 7, Line 1, replace "lub" with --Iub--

At Column 7, Line 3, replace "lur" with --Iur--

At Column 7, Line 64, replace "mobility management gateway (MME)" with --mobility management entity (MME) gateway--

At Column 8, Line 4, replace "3interface" with --interface--

At Column 11, Lines 22 and 25; Column 14, Lines 50 and 66; Column 15, Line 9, replace "power-controlled" with --power controlled--

At Column 13, Line 40, replace "aquire" with --acquire--

At Column 15, Line 3, replace "min {PPUSCH" with --min{PPUSCH--

At Column 15, Line 14, replace "(i))[dBm]" with --(i) [dBm]--

At Column 18, Line 36, replace "an may be" with --may be an--

At Column 18, Line 46, replace "PCMAX_Hwhere" with --PCMAX_H where--

At Column 18, Line 51, replace "PCMAX_H,XL" with --PCMAX_H,XL.--

Signed and Sealed this
Twenty-third Day of August, 2022

Katherine Kelly Vidal
*Director of the United States Patent and Trademark Office*

CERTIFICATE OF CORRECTION (continued)
U.S. Pat. No. 10,568,052 B2

At Column 20, Lines 17 and 20; Column 31, Lines 1, 5, 35 and 36, replace "long-term" with --long term--

At Column 27, Lines 30 and 66; Column 28, Lines 3, 5, 7 and 17, replace "crosslink" with --cross link--

At Column 28, Line 17, replace "TPCs" with --TPCs.--

At Column 29, Line 26, replace "and." with --an--

At Column 29, Line 33, replace "TPCXL}"" with --TPCXL}.--

In the Claims

In Claim 1, at Column 33, Line 3, replace "formula," with --formula--

In Claim 7, at Column 33, Lines 25-26, after "first" delete "one of the plurality of"

In Claim 11, at Column 34, Line 7, replace "formula" with --formula is--

In Claim 19, at Column 34, Line 43, replace "trabsmission" with --transmission--